United States Patent
Hasegawa et al.

(10) Patent No.: US 8,433,289 B2
(45) Date of Patent: Apr. 30, 2013

(54) COMMUNICATION APPARATUS

(75) Inventors: Junichi Hasegawa, Toyonaka (JP); Akira Chugo, Kawasaki (JP); Yuuji Niwa, Sagamihara (JP); Takamitsu Shirai, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/430,210

(22) Filed: Mar. 26, 2012

(65) Prior Publication Data

US 2012/0329428 A1 Dec. 27, 2012

(30) Foreign Application Priority Data

Jun. 22, 2011 (JP) ................... 2011-137982

(51) Int. Cl.
*H04M 1/66* (2006.01)
(52) U.S. Cl.
USPC ........... 455/411; 370/356; 370/259; 370/329; 370/312
(58) Field of Classification Search ........... 455/356, 455/259, 329, 312; 370/356, 259, 329, 312
See application file for complete search history.

(56) References Cited

U.S. PATENT DOCUMENTS

| | | | |
|---|---|---|---|
| 7,831,697 B2 | 11/2010 | Fukushima | |
| 2005/0120221 A1 | 6/2005 | Arnold et al. | |
| 2010/0325714 A1* | 12/2010 | Iyer et al. | 726/8 |
| 2011/0047256 A1* | 2/2011 | Babu et al. | 709/223 |
| 2011/0103266 A1* | 5/2011 | Andreasen et al. | 370/259 |
| 2012/0166617 A1* | 6/2012 | Chang et al. | 709/224 |

FOREIGN PATENT DOCUMENTS

| | | |
|---|---|---|
| JP | A-2004-266305 | 9/2004 |
| JP | A-2005-513660 | 5/2005 |
| JP | A-2005-520230 | 7/2005 |
| JP | A-2008-505512 | 2/2008 |
| WO | WO-03/077071 A2 | 9/2003 |
| WO | WO-2005/101747 A2 | 10/2005 |

* cited by examiner

*Primary Examiner* — Kwasi Karikari
(74) *Attorney, Agent, or Firm* — Fujitsu Patent Center

(57) ABSTRACT

A communication apparatus in a radio access network relays data transmission to and from a remote network. The communication apparatus includes a monitoring unit to monitor an authentication procedure performed when a mobile station makes a connection of a link to the remote network, as well as when the mobile station disconnects the link to the remote network. The communication apparatus also includes a producing unit to produce information for disconnecting a session of the mobile station based on progress of the authentication procedure monitored by the monitoring unit. For example, the producing unit produces information for disconnecting a session of the mobile station when the monitoring unit has observed deauthentication of the mobile station.

9 Claims, 37 Drawing Sheets

FIG. 8

15c   RADIUS AUTHENTICATION STATUS TABLE

| ID | MOBILE STATION IP ADDRESS | RADIUS AUTHENTICATION STATUS |
|---|---|---|
| 1 | 192.168.1.10 | Starting Authentication, Authentication Completed, Terminating Authentication, or Deauthenticated |
| ⋮ | ⋮ | ⋮ |

FIG. 9

15d ADDRESS TRANSLATION TABLE

| ID | MOBILE STATION IP ADDRESS | MOBILE STATION PORT NUMBER | TRANSLATED IP ADDRESS | TRANSLATED PORT NUMBER | PACKET TYPE |
|---|---|---|---|---|---|
| 1 | 192.168.1.10 | Xxxx | 210.153.84.10 | Yyyy | UDP or TCP |
| ... | ... | ... | ... | ... | ... |

| TCP CONNECTION STATUS | REMOTE DEVICE IP ADDRESS | REMOTE DEVICE PORT NUMBER | SEQ NUMBER | ACK NUMBER |
|---|---|---|---|---|
| LISTEN, ESTAB, ETC | aaa.bbb.ccc.ddd | zzzz | LAST SEQ | LAST ACK |
| ... | ... | ... | ... | ... |

FIG. 10

15e FILTERING TABLE

| ID | MOBILE STATION IP ADDRESS | MOBILE STATION PORT NUMBER | TRANSLATED IP ADDRESS | TRANSLATED PORT NUMBER | PACKET TYPE |
|---|---|---|---|---|---|
| 1 | 192.168.1.10 | xxxx | 210.153.84.10 | yyyy | UDP or TCP |
| ⋮ | ⋮ | ⋮ | ⋮ | ⋮ | ⋮ |

FIG. 22

42c GTP TUNNEL CONNECTION STATUS TABLE

| ID | MOBILE STATION IP ADDRESS | TEID | GTP TUNNEL CONNECTION STATUS |
|---|---|---|---|
| 1 | 192.168.1.10 | xxxx | No Connection, Starting Connection, Connected, or Terminating Connection |
| ⋮ | ⋮ | ⋮ | ⋮ |

US 8,433,289 B2

COMMUNICATION APPARATUS

CROSS-REFERENCE TO RELATED APPLICATION

This application is based upon and claims the benefit of priority of the prior Japanese Patent Application No. 2011-137982, filed on Jun. 22, 2011, the entire contents of which are incorporated herein by reference.

FIELD

The embodiments discussed herein relate to a communication apparatus used in a radio access network to relay data transmission to and from a remote network.

BACKGROUND

Mobile virtual network operator (MVNO) is the term referring to a wireless carrier that provides communication services to their customers by using a network infrastructure, not of their own, but leased from a mobile network operator (MNO). For example, an MVNO carrier leases a radio access network such as a Long Term Evolution (LTE) network from an MNO to permit their service users to make a link connection from their mobile stations to the MVNO's own network. Content servers are deployed on this MVNO network to provide the users with various services.

As an example of conventional techniques, several researchers propose a system and method for automatically and dynamically initiating and establishing secure connections between a server and a client using a session control server. See, for example, Japanese National Publication of International Patent Application No. 2008-505512. As another conventional technique, a system and a method are proposed for enhancement of electronic security. As yet another conventional technique, a network management method is proposed for managing network devices with dynamic IP addresses. As still another conventional technique, a computer-based technique is proposed for processing end-to-end business transactions in a Transmission Control Protocol/Internet Protocol (TCP/IP) environment.

As mentioned above, the radio access network of an MNO is connected to a remote network (e.g., MVNO network). A router or gateway is placed at the point of interface between those two networks, and it is this interface device that controls connection and disconnection of communication links from mobile stations to the remote network. For this reason, servers on the remote network are unable to recognize disconnection of a link of a mobile station that they are serving.

When a link connection from a mobile station to the remote network is successfully created, the mobile station then establish a session with a server on the remote network. However, the above-noted interface device is not involved in the control process of establishing and releasing such sessions. This means that the session of a mobile station could remain in an active state even after the link between the mobile station and remote network is disconnected.

SUMMARY

According to an aspect of the embodiments, there is provided a communication apparatus used in a radio access network to relay data transmission to and from a remote network. This communication apparatus includes: a monitoring unit configured to monitor an authentication procedure performed when a mobile station makes a connection of a link to the remote network, as well as when the mobile station disconnects the link to the remote network; and a producing unit configured to produce information for disconnecting a session of the mobile station based on progress of the authentication procedure monitored by the monitoring unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an exemplary data structure of a RADIUS authentication status table;

FIG. 9 illustrates an exemplary data structure of an address translation table;

FIG. 10 illustrates an exemplary data structure of a filtering table;

FIG. 22 illustrates an exemplary data structure of a GTP tunnel connection status table;

DESCRIPTION OF EMBODIMENTS

Figure 1:
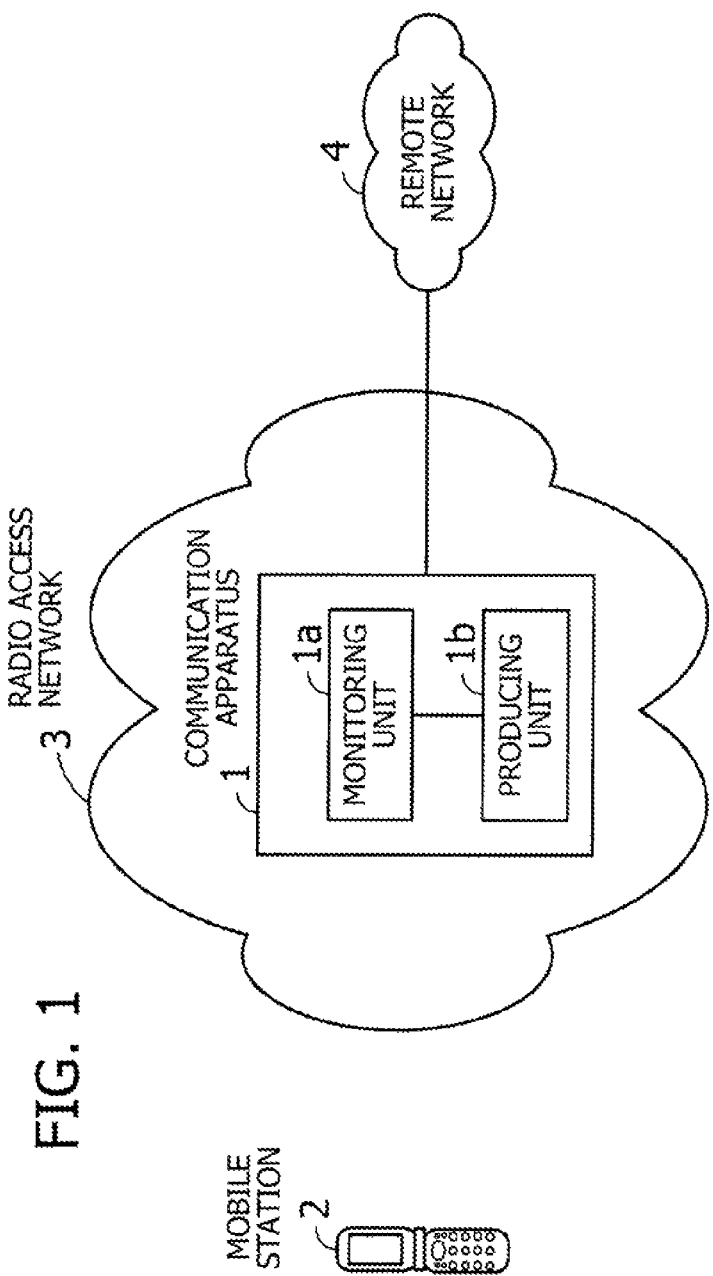
FIG. 1 illustrates a communication apparatus according to a first embodiment.

Several embodiments will now be described in detail below with reference to the accompanying drawings, wherein like reference numerals refer to like elements throughout.

(a) First Embodiment

FIG. 1 illustrates a communication apparatus according to a first embodiment. The illustrated communication apparatus 1 is located in a radio access network 3. The radio access network 3 may be, for example, an LTE network, also known as an Evolved Universal Terrestrial Radio Access Network (e-UTRAN). The radio access network 3 is coupled to another network 4 (referred to herein as a "remote network") such as an MVNO network. The communication apparatus 1 may be, for example, a firewall that relays data transmission between a mobile station 2 and the remote network 4.

The mobile station 2 is, for example, a cellular phone or other wireless communication device. The mobile station 2 may be allowed to reach the remote network 4 via the communication apparatus 1 by using a radio link to an Evolved Node B (eNB, not illustrated) in the radio access network 3.

The illustrated communication apparatus 1 includes a monitoring unit 1a and a producing unit 1b. The monitoring unit 1a monitors authentication procedures of the mobile station 2 which may be performed when establishing, as well as when disconnecting, its link connection to the remote network 4. This authentication procedure may be performed in accordance with, for example, the Remote Authentication Dial-in User Service (RADIUS) protocol. For example, when the mobile station 2 is to make a link connection with the remote network 4, a gateway (GW, not illustrated) placed between the mobile station 2 and communication apparatus 1 performs a RADIUS authentication procedure, together with an authentication server (also not illustrated) in the remote network 4. When successfully authenticated as a legitimate mobile station, the mobile station 2 is allowed to make access to, for example, a content server (not illustrated) in the remote network 4. The RADIUS authentication function of the above gateway and authentication server is also called up for the purpose of deauthentication when the mobile station 2 disconnects its link to the remote network 4. The link from the mobile station 2 to the remote network 4 is disconnected upon completion of the RADIUS deauthentication. The monitoring unit 1a in the communication apparatus 1 monitors such interaction between the gateway and authentication server during the RADIUS authentication of the mobile station 2.

Based on the progress of authentication procedures monitored by the monitoring unit 1a, the producing unit 1b produces information for disconnecting the session of the mobile station 2. Suppose, for example, that the monitoring unit 1a has observed deauthentication of the mobile station 2. The producing unit 1b then produces a piece of information, e.g., a reset (RST) packet, for disconnecting the existing session of the mobile station 2. That is, the producing unit 1b interprets the observed deauthentication of the mobile station 2 as an event of disconnecting its link to the remote network 4 and thus produces an RST packet. The produced RST packet is transmitted to, for example, a content server with which the mobile station 2 has had a session. The session between the mobile station 2 and content server is thus discontinued.

As can be seen from the above, the proposed communication apparatus 1 includes a monitoring unit 1a to monitor an authentication procedure of the mobile station 2 which is performed when a link connection from the mobile station 2 to the remote network 4 is established or disconnected. The communication apparatus 1 is designed to produce, with its producing unit 1b, information for disconnecting the session of the mobile station 2, based on the observation of the authentication procedure by the monitoring unit 1a. These features of the proposed communication apparatus 1 make it possible to disconnect sessions of the mobile station 2 subsequently to disconnection of its link to the remote network 4.

(b) Second Embodiment

Figure 2:
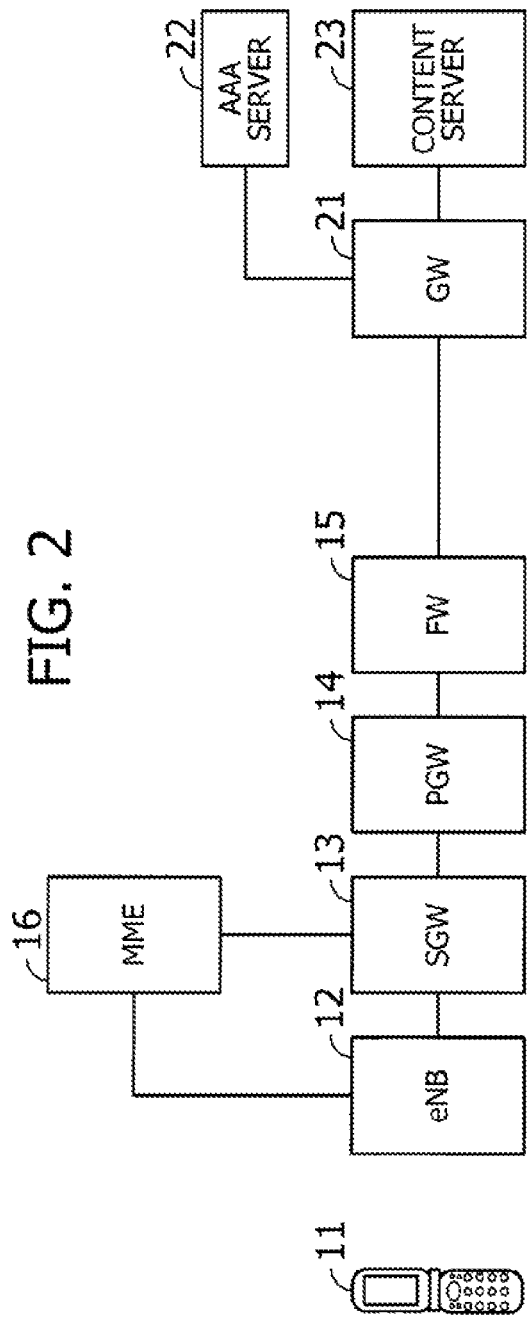
FIG. 2 illustrates an exemplary network configuration that involves a communication apparatus according to a second embodiment.

This section describes a second embodiment in detail with reference to the accompanying drawings. FIG. 2 illustrates an exemplary network configuration that involves a communication apparatus according to the second embodiment. Specifically FIG. 2 depicts layer-3 connections between an LTE network and an MVNO network.

The network of FIG. 2 includes, among other things, a mobile station 11 (e.g., cellular phone), an eNB 12, a serving gateway (SGW) 13, a packet data network gateway (PGW) 14, a firewall (FW) 15, and a mobility management entity (MME) 16. The eNB 12 is a base station with which the mobile station 11 communicates over a radio link. The SGW 13 is a gateway that transfers data from a plurality of eNBs, including the illustrated eNB 12, to the PGW 14. The PGW 14 is a gateway that allocates unused IP addresses from its address pool to mobile stations, including the illustrated mobile station 11.

The above eNB 12, SGW 13, PGW 14, FW 15, and MME 16 constitute an LTE network. The FW 15 protects this LTE network from unauthorized access from external networks. The FW 15 further monitors authentication procedures of the mobile station 11 which may be performed when establishing, as well as when disconnecting, its link connection to the MVNO network. Based on such observation of authentication procedures, the FW 15 produces a piece of information for disconnecting a session of the mobile station 11. The MME 16 manages the location of the mobile station 11, as well as controlling its connection.

Referring now to the right half of FIG. 2, a gateway (GW) 21 relays connections from the above LTE network. Coupled to this GW 21 is an Authentication, Authorization, and Accounting (AAA) server 22 that executes authentication of the mobile station 11 when it establishes or disconnects its link connection to an MVNO network. Also coupled is a content server 23 that stores data content for access from the mobile station 11. The above GW 21, AAA server 22, and content server 23 constitute an MVNO network. For example, a wide area Ethernet service may be used to interconnect the MVNO network and the LTE network.

Figure 3:
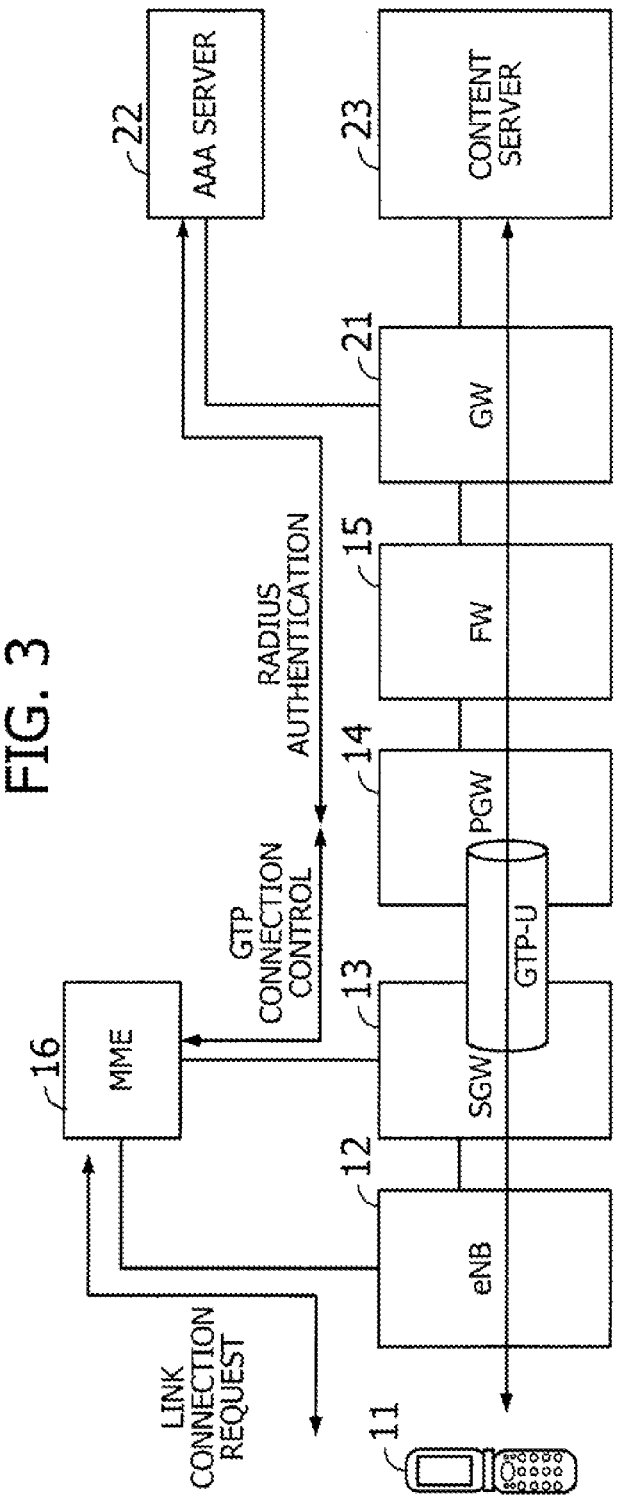
FIG. 3 illustrates how the network system of FIG. 2 works.

FIG. 3 illustrates how the network system of FIG. 2 works, where like reference numerals are affixed to like elements. The SGW 13 may receive a link connection request from the mobile station 11 via the MME 16. In response, the SGW 13 activates the General Packet Radio Service Tunneling Protocol for User Plane (GTP-U) to communicate with the PGW 14. This creates a GTP tunnel between the SGW 13 and PGW 14.

The PGW 14 works together with the AAA server 22 to perform a RADIUS authentication procedure for the mobile station 11 in response to a GTP-tunnel connection request from the SGW 13. This RADIUS authentication procedure by the PGW 14 and AAA server 22 may successfully authenticate the mobile station 11 as a legitimate mobile station. The mobile station 11 is then allowed to make access to the content server 23 via the GW 21 and receive desired services from the content server 23. When a GTP-tunnel disconnection request is issued afterwards from the SGW 13, the PGW 14 communicates with the AAA server 22 again to release the RADIUS-authenticated state of the mobile station 11. This deauthentication is followed by disconnection of the mobile station 11 from the MVNO network.

Figure 4:
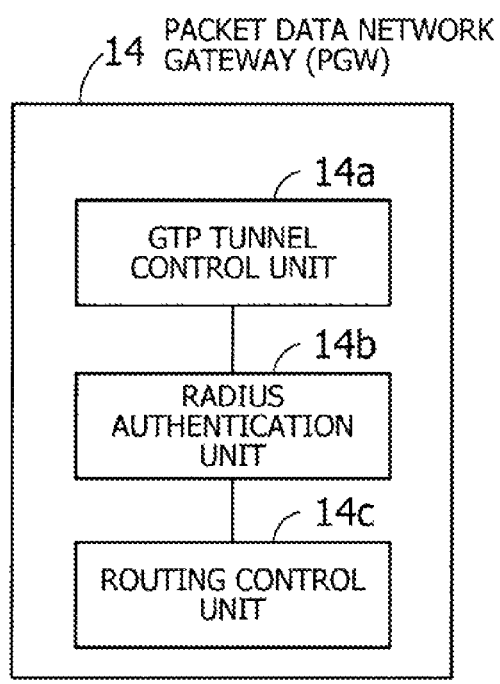
FIG. 4 is an exemplary functional block diagram of a packet data network gateway.

FIG. 4 is an exemplary functional block diagram of the PGW 14. As seen in FIG. 4, the PGW 14 includes a GTP tunnel control unit 14a, a RADIUS authentication unit 14b, and a routing control unit 14c. The GTP tunnel control unit 14a establishes a GTP tunnel to the SGW 13, as necessary, by using GTP-U protocol. The GTP tunnel control unit 14a also releases (or disconnects) an existing GTP tunnel to the SGW 13, as necessary, by using GTP-U protocol.

The RADIUS authentication unit 14b works together with the AAA server 22 to perform a RADIUS authentication procedure for a mobile station 11 when it requests a link connection to the MVNO network. The RADIUS authentication unit 14b may also work together with the AAA server 22 to perform a RADIUS authentication procedure for a mobile station 11 when it requests disconnection of its link to the MVNO network. The routing control unit 14c controls routing of data packets for the mobile station 11 whose authenticity has been confirmed through a RADIUS authentication procedure.

Figure 5:
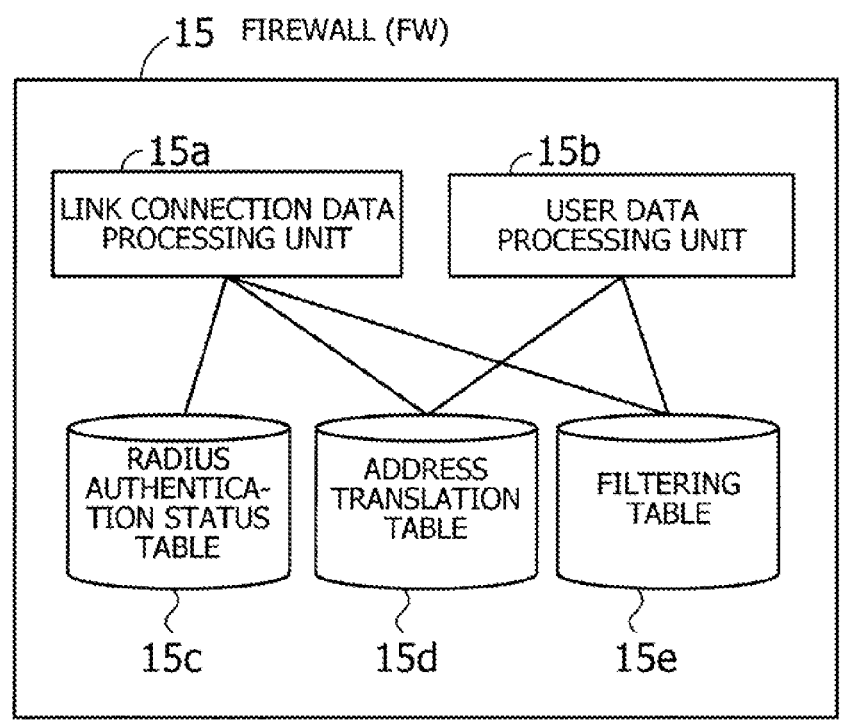
FIG. 5 is an exemplary functional block diagram of a firewall.

FIG. 5 is an exemplary functional block diagram of a firewall. The illustrated FW 15 includes a link connection data processing unit 15a, a user data processing unit 15b, a RADIUS authentication status table 15c, an address translation table 15d, and a filtering table 15e. The link connection data processing unit 15a performs data processing operation for a mobile station 11 to make a link connection. During the course of this processing, the link connection data processing unit 15a may make access to the RADIUS authentication status table 15c, address translation table 15d, and filtering table 15e. The user data processing unit 15b manipulates user data of the mobile station 11 after it is recognized as a legitimate user of the MVNO network. For example, the user data processing unit 15b performs processing such as the Network Address Port Translation (NAPT) by consulting the address translation table 15d and filtering table 15e. Detailed data structure of the RADIUS authentication status table 15c, address translation table 15d, and filtering table 15e will be described later by way of example.

Figure 6:
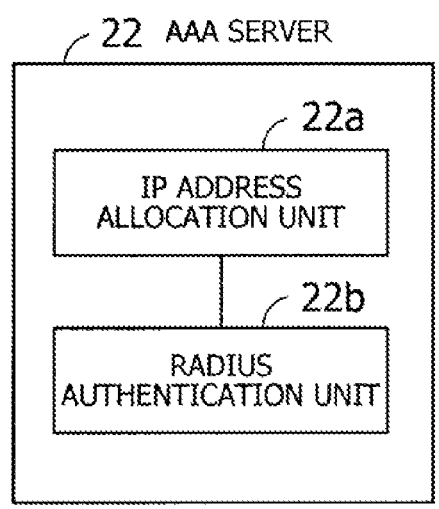
FIG. 6 is an exemplary functional block diagram of an AAA server.

FIG. 6 is an exemplary functional block diagram of an AAA server. The illustrated AAA server 22 includes an IP address allocation unit 22a and a RADIUS authentication unit 22b. The IP address allocation unit 22a provides an IP address for assignment to the content server 23. The RADIUS authentication unit 22b works together with the PGW 14 to execute a RADIUS authentication procedure for a mobile station 11.

Figure 7:
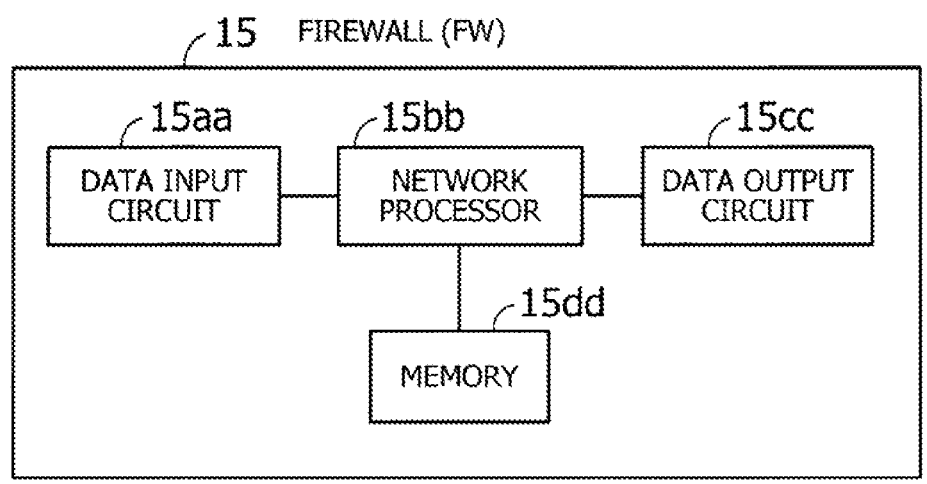
FIG. 7 illustrates an exemplary hardware configuration of a firewall.

FIG. 7 illustrates an exemplary hardware configuration of a firewall. The illustrated firewall (FW) 15 includes a data input circuit 15aa, a network processor 15bb, a data output circuit 15cc, and a memory 15dd. The data input circuit 15aa and data output circuit 15 cc may be implemented by using, for example, a field-programmable gate array (FPGA). The network processor 15bb may be implemented by using, for example, a central processing unit (CPU) or a digital signal processor (DSP).

The data input circuit 15aa receives data from the PGW 14 or GW 21. The data output circuit 15cc outputs data processed by the network processor 15bb to the PGW 14 or GW 21. The network processor 15bb processes link connection data and user data. Functions of the above link connection data processing unit 15a and user data processing unit 15b of FIG. 5 may be implemented by this network processor 15bb.

The memory 15dd is a storage device to store data of the RADIUS authentication status table 15c, address translation table 15d, and filtering table 15e. Also stored in the memory 15dd are operating system (OS) programs and application programs executed by the network processor 15bb.

FIG. 8 illustrates an exemplary data structure of a RADIUS authentication status table. The illustrated RADIUS authentication status table 15c is formed from the following data fields: "ID," "Mobile Station IP Address," and "RADIUS Authentication Status." The ID field contains an identifier for distinguishing each data record stored in the RADIUS authentication status table 15c. The mobile station IP address field contains an IP address that the PGW 14 has assigned to a mobile station 11. The RADIUS authentication status field indicates the status of RADIUS authentication concerning the mobile station 11. Specifically the RADIUS authentication status field takes a value of, for example, "Deauthenticated," "Starting Authentication," "Authenticated," and "Terminating Authentication" to indicate the status Suppose, for example, that the mobile station 11 has issued a link connection request to the MVNO network. In response, the PGW 14 and AAA server 22 start a RADIUS authentication procedure for the mobile station 11. Specifically the PGW 14 transmits the IP address of the requesting mobile station 11 to the AAA server 22. The link connection data processing unit 15a in the FW 15 monitors and captures this transmitted IP address of the mobile station 11 and stores it in the mobile station IP address field of the RADIUS authentication status table 15c. The link connection data processing unit 15a further assigns an identifier to that IP address entry in the mobile station IP address field and puts the identifier in its corresponding ID field.

In addition to the above, the link connection data processing unit 15a updates the RADIUS authentication status field with a new RADIUS authentication status. For example, when the PGW 14 and AAA server 22 have started a RADIUS authentication procedure for the mobile station 11, the link connection data processing unit 15a enters a value of "Starting Authentication" to the RADIUS authentication status field. When this RADIUS authentication procedure between the PGW 14 and AAA server 22 is finished, the link connection data processing unit 15a gives "Authenticated" as a new value of the RADIUS authentication status field. When, on the other hand, the PGW 14 and AAA server 22 have started a deauthentication procedure for the mobile station 11, the link connection data processing unit 15a changes the RADIUS authentication status field to "Terminating Authentication." When this deauthentication procedure is finished between the PGW 14 and AAA server 22, the link connection data processing unit 15a enters "Deauthenticated" as a new value of the RADIUS authentication status field.

FIG. 9 illustrates an exemplary data structure of an address translation table. The illustrated address translation table 15d is formed from the following data fields: "ID," "Mobile Station IP Address," "Mobile Station Port Number," "Translated IP Address," "Translated Port Number," "Packet Type," "TCP Connection Status," "Remote Device IP Address," "Remote Device Port Number," "SEQ Number," and "ACK Number." This address translation table 15d stores information for the link connection data processing unit 15a to produce RST packets (described later), as well as for the user data processing unit 15b to execute NAPT operation.

The ID field contains an identifier for distinguishing each data record stored in the address translation table 15d. The mobile station IP address field contains an IP address that the PGW 14 has assigned to a mobile station 11 that requests communication. The mobile station port number field contains a port number of that mobile station 11. The translated IP address field contains an IP address that the user data processing unit 15b has translated for the mobile station 11. The mobile station 11 appears to be in this translated IP address when it is viewed from outside the LTE network (e.g., from MVNO network). The translated port number field indicates a port number that the user data processing unit 15b has translated for the mobile station 11. The mobile station 11 appears to be at this port number when it is viewed from outside the LTE network (e.g., from MVNO network).

The packet type field contains information indicating the type of packets that the mobile station 11 sends and receives. For example, the packet type field takes a value of "UDP" to indicate that the mobile station 11 sends and receives User Datagram Protocol (UDP) packets. Similarly the packet type field takes a value of "TCP" when the mobile station 11 sends and receives TCP packets.

The TCP connection status field contains information indicating the status of TCP connection of the mobile station 11 when it uses TCP packets for communication. For example, the TCP connection may be in a "LISTEN" state, "SYNSENT" state, "SYNRCVD" state, or "ESTAB" state when the mobile station 11 has an active connection to the content server 23.

The remote device IP address field contains an IP address indicating with which remote device the mobile station 11 is communicating. For example, this field may contain the IP address of the content server 23 when the mobile station 11 is communicating with the content server 23. Similarly the remote device port number field contains a port number of the remote device with which the mobile station 11 is communicating. For example, this field may contain the port number of the content server 23 when the mobile station 11 is communicating with the content server 23.

The SEQ number field contains a sequence number of a packet that is transmitted from the remote device to the mobile station 11. The ACK number field contains an ACK number of an ACK message that is transmitted from the mobile station 11 back to the remote device.

Suppose, for example, that the mobile station 11 makes a link connection to the MVNO network in order to communicate with a content server 23. It is also assumed that the mobile station 11 has been assigned an IP address of 192.168.1.10 from the PGW 14. The user data processing unit 15b extracts IP address and port number from a packet that the mobile station 11 has transmitted to the content server 23. The user data processing unit 15b enters the IP address and port number into the mobile station IP address field and mobile station port number field, respectively, as well as assigning an identifier to the mobile station 11 and recording it in the ID field of the address translation table 15d.

The user data processing unit 15b further executes address translation for the mobile station 11 and enters the resulting IP address and port number of the mobile station 11 into the translated IP address field and translated port number field, respectively. The user data processing unit 15b fills the packet type field with a value indicating which type of packets the mobile station 11 is using. In the case of TCP packets, the user data processing unit 15b further fills the TCP connection status field with a value indicating the current state of the TCP connection.

The user data processing unit 15b obtains the IP address and port number of the content server 23, with which the mobile station 11 is communicating, and enters them into the Remote Device IP address field and Remote Device port number field, respectively. The user data processing unit 15b also fills the SEQ number field and ACK number field respectively with the last sequence number of packets sent from the content server 23 to the mobile station 11 and the last ACK number of ACK messages from the mobile station 11 to the content server 23.

FIG. 10 illustrates an exemplary data structure of a filtering table. The illustrated filtering table 15e is formed from the following data fields: "ID," "Mobile Station IP Address," "Mobile Station Port Number," "Translated IP Address," "Translated Port Number," and "Packet Type." What is stored in these data fields of the filtering table 15e is actually a copy of the ID, mobile station IP address, mobile station port number, translated IP address, translated port number, and packet type fields of the address translation table 15d described in FIG. 9. Specifically the link connection data processing unit 15a transfers data values from the address translation table 15d to the filtering table 15e when RADIUS authentication of the mobile station 11 is cleared.

When translating IP address and port number of the mobile station 11, the user data processing unit 15b refers to the filtering table 15e to make sure that the translated IP address and port number are different from those stored in the filtering table 15e. In other words, the user data processing unit 15b chooses an IP address and a port number that are not stored in the translated IP address field and the translated port number field of the filtering table 15e and assigns them to the mobile station 11.

Suppose, for example, that the mobile station 11 has been assigned an IP address of "192.168.1.10" by the PGW 14 and is now attempting to communicate with the content server 23 by using a port number "xxxx." In this case, the user data processing unit 15b consults the filtering table 15e and finds an existing record that includes IP address "210.153.84.10" and port number "yyyy." The user data processing unit 15b thus assigns an IP address other than "210.153.84.10," as well as a port number other than "yyyy," to the mobile station 11. The user data processing unit 15b further stores the IP address and port number in the translated IP address field and translated port number field of the address translation table 15d, respectively.

Figure 11:
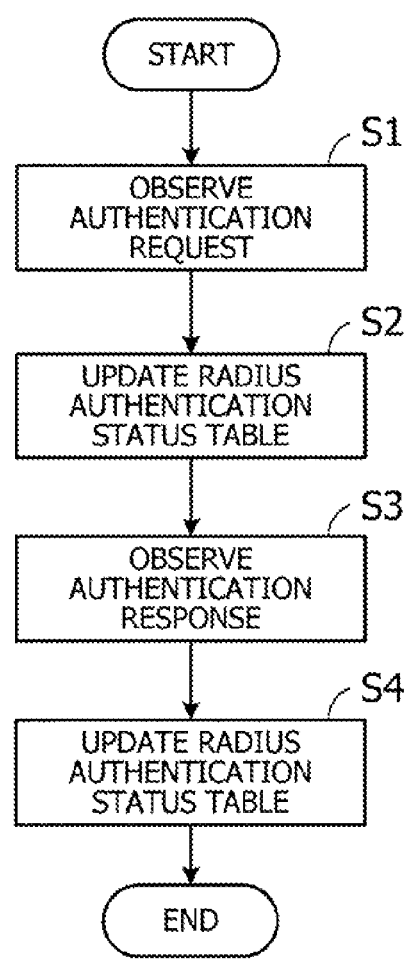
FIG. 11 is a flowchart illustrating operation of a link connection data processing unit.

FIG. 11 is a flowchart illustrating operation of the link connection data processing unit 15a. Specifically this flowchart of FIG. 11 indicates what the link connection data processing unit 15a performs when the mobile station 11 makes a link connection request to reach the MVNO network.

(Step S1) The link connection data processing unit 15a observes a RADIUS authentication request from the PGW 14 to the AAA server 22 in the packet traffic being monitored.

(Step S2) The link connection data processing unit 15a obtains the IP address of the mobile station 11 from the observed RADIUS authentication request. The link connection data processing unit 15a stores this obtained IP address in the mobile station IP address field of the RADIUS authentication status table 15c. The link connection data processing unit 15a also enters a value of "Starting Authentication" to the RADIUS authentication status field of the same.

(Step S3) The link connection data processing unit 15a observes a response to the RADIUS authentication request from the PGW 14 to the AAA server 22. The link connection data processing unit 15a may exit from the illustrated process when no response is observed within a predetermined time limit.

(Step S4) The link connection data processing unit 15a updates the RADIUS authentication status table 15c by entering "Authenticated" as a new value of its RADIUS authentication status field.

Figure 12:
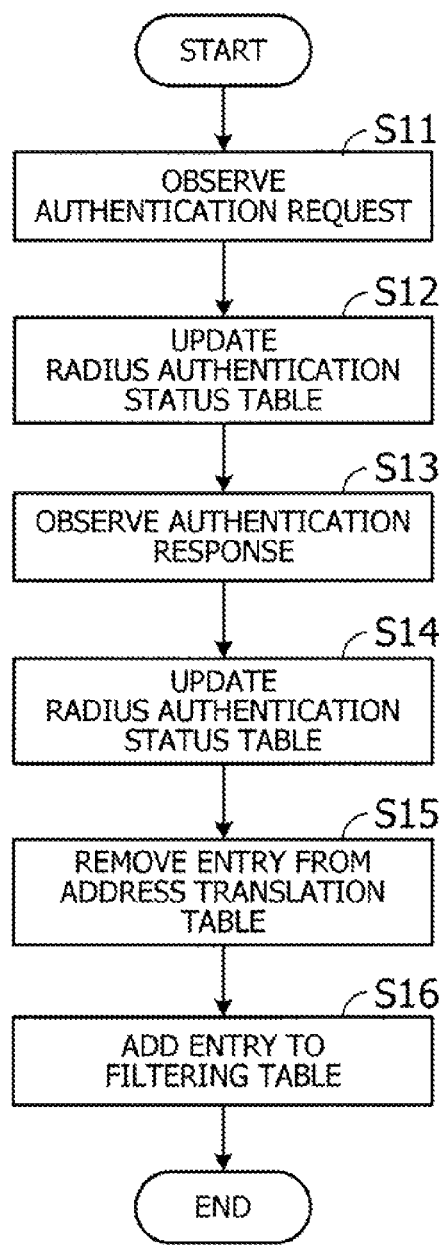
FIG. 12 is another flowchart illustrating operation of the link connection data processing unit.

FIG. 12 is another flowchart illustrating operation of the link connection data processing unit 15a. Specifically this flowchart of FIG. 12 indicates what the link connection data processing unit 15a performs when the mobile station 11 disconnects its link to the MVNO network.

(Step S11) The link connection data processing unit 15a observes a RADIUS deauthentication request that is issued from the PGW 14 to the AAA server 22 for disconnection of an existing link of the mobile station 11.

(Step S12) The link connection data processing unit 15a updates the RADIUS authentication status table 15c by entering "Terminating Authentication" as a new value of its RADIUS authentication status field.

(Step S13) The link connection data processing unit 15a observes a response to the RADIUS deauthentication request of step S11. The link connection data processing unit 15a may exit from the illustrated process when no response is observed within a predetermined time limit.

(Step S14) The link connection data processing unit 15a updates the RADIUS authentication status table 15c by entering "Deauthenticated" as a new value of its RADIUS authentication status field.

Here the link connection data processing unit 15a may also produce an RST packet of the TCP protocol in the case where the address translation table 15d indicates a "TCP Connected" state in its TCP connection status field. The produced RST packet contains a sequence number and an ACK number which are copied from the SEQ number field and ACK number field of the address translation table 15d. The produced RST packet is transmitted to the content server 23 with which the mobile station 11 has been communicating in the current session. The content server 23 receives this RST packet and checks its sequence number and ACK number. If the received sequence and ACK numbers match with what are expected, the content server 23 disconnects the current session with the mobile station 11.

(Step S15) The link connection data processing unit 15a removes the entry of the mobile station 11 from the address translation table 15d since its authentication is terminated.

(Step S16) Now that the mobile station 11 is unregistered from the address translation table 15d, the link connection data processing unit 15a adds the removed data of the mobile station 11 as an entry of the filtering table 15e.

Figure 13:
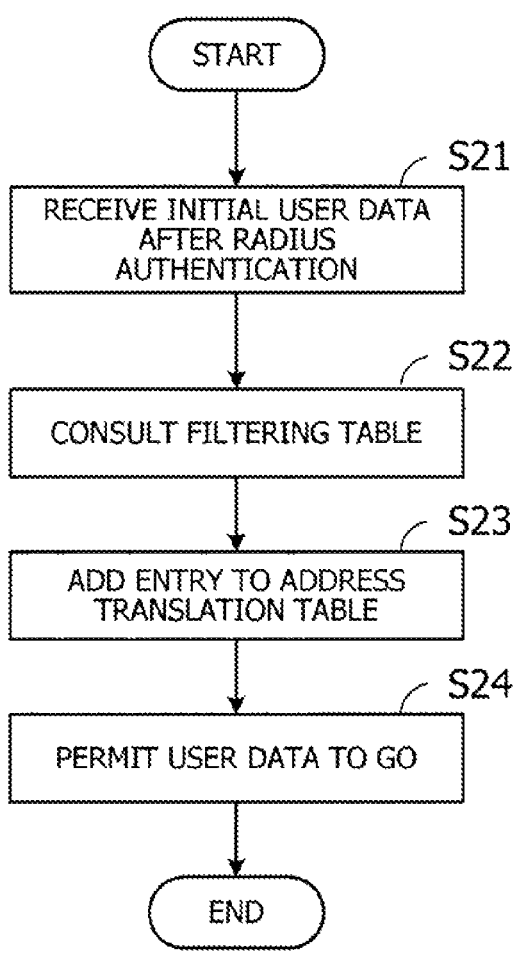
FIG. 13 is a flowchart illustrating operation of a user data processing unit.

FIG. 13 is a flowchart illustrating operation of the user data processing unit 15b.

(Step S21) The user data processing unit 15b receives initial user data that the mobile station 11 or content server 23 has transmitted in the first place after RADIUS authentication.

(Step S22) The user data processing unit 15b consults the filtering table 15e.

(Step S23) The user data processing unit 15b translates the IP address and port number of the mobile station 11. That is, the user data processing unit 15b assigns an IP address and a port number that are both different from the ones stored in the filtering table 15e consulted at step S22. The user data processing unit 15b enters the translated IP address and port number, together with other relevant entries of the mobile station 11, into the address translation table 15d.

(Step S24) The user data processing unit 15b permits the user data from the mobile station 11 or content server 23 to make its way to the destination. For subsequent user data, the user data processing unit 15b only forwards those for the connected GTP tunnel, while discarding other data.

Figure 14:
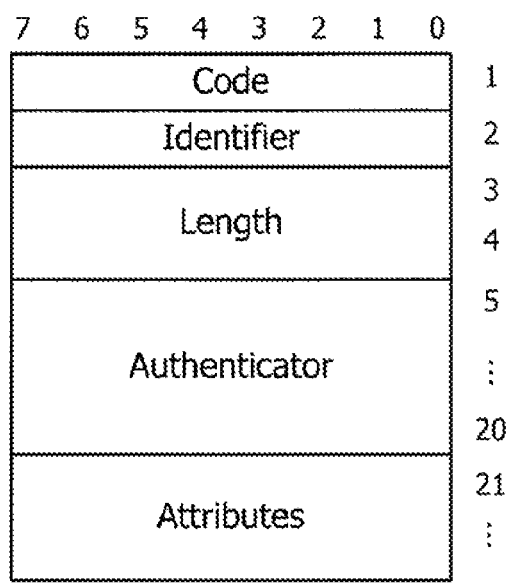
FIG. 14 illustrates a RADIUS packet.

FIG. 14 illustrates a RADIUS packet. The PGW 14 and AAA server 22 use RADIUS packets in their processing of RADIUS authentication. The illustrated RADIUS packet of FIG. 14 is formed from a plurality of data fields named as follows: "Code," "Identifier," "Length," "Authenticator," and "Attributes."

The code field contains a code representing a specific type of RADIUS packets. For example, this code indicates whether the packet of FIG. 14 is an authentication request packet or an authentication response packet. The identifier field contains information that associates a request with a response. The length field contains a value indicating the length of the RADIUS packet. The authenticator field contains information used for interaction between the PGW 14 and AAA server 22 as to validation and cryptographic operation of the AAA server 22. Lastly the attributes field contains code properties, parameters, and other information.

Figure 15:
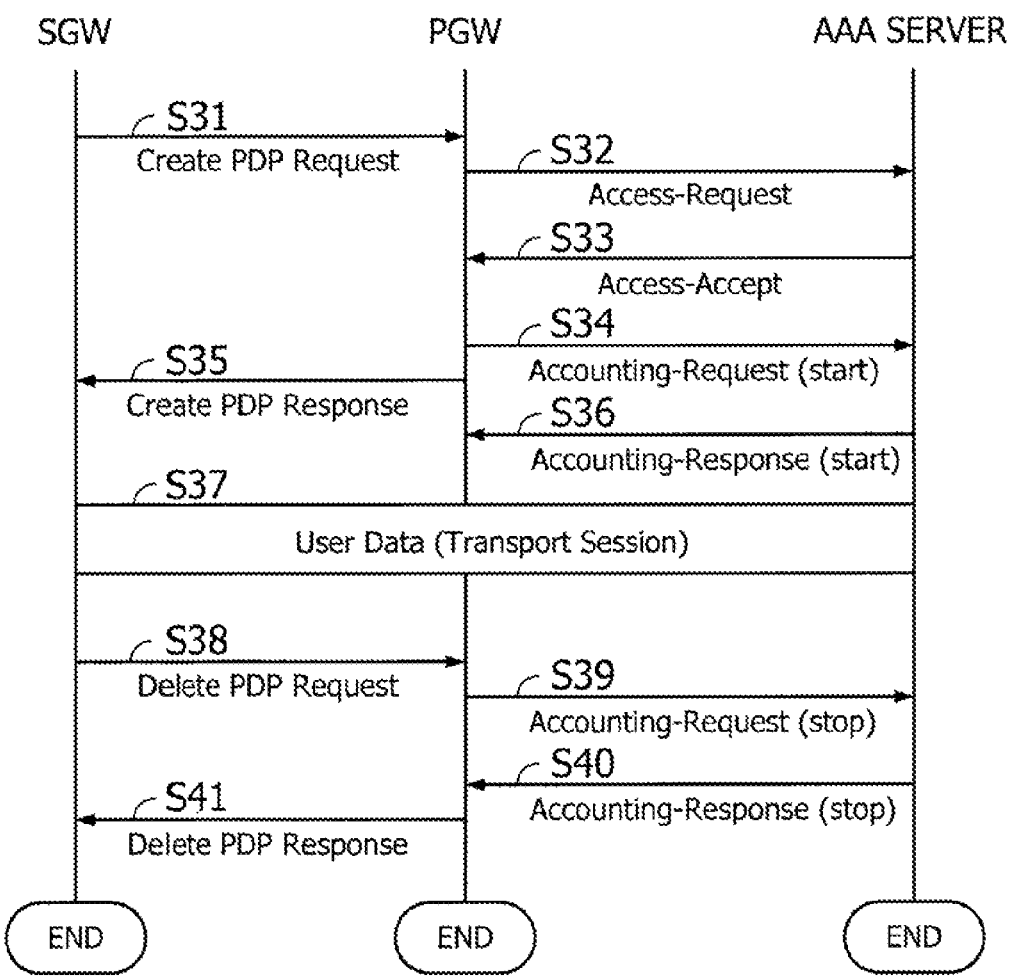
FIG. 15 is a sequence diagram illustrating a RADIUS authentication procedure.

FIG. 15 is a sequence diagram illustrating a RADIUS authentication procedure. Each step of this sequence will be described below in the order of step numbers.

(Step S31) To build a GTP tunnel to the PGW 14, the SGW 13 sends the PGW 14 a "Create PDP Request" message requesting establishment of a GTP tunnel connection, where PDP stands for "Packet Data Protocol."

(Step S32) Upon receipt of the GTP tunnel connection request from the SGW 13, the PGW 14 transmits an "Access-Request" message to the AAA server 22.

(Step S33) The AAA server 22 responds with an "Access-Accept" message back to the PGW 14 to grant its access request.

(Step S34) The PGW 14 transmits an "Accounting-Request (start)" message to the AAA server 22 to request RADIUS authentication.

(Step S35) The PGW 14 transmits a "Create PDP Response" message as a response to the GTP tunnel connection request of the SGW 13, thus establishing a GTP tunnel between the SGW 13 and PGW 14.

(Step S36) The AAA server 22 returns an "Accounting-Response (start)" message to the PGW 14 as a response to the above RADIUS authentication request of step S34. This message permits the mobile station 11 to make access to the MVNO network.

(Step S37) The mobile station 11 and content server 23 execute a transport session to communicate their respective user data.

(Step S38) Suppose that the mobile station 11 now disconnects its link connection to the MVNO network. The SGW 13 transmits a "Delete PDP Request" message to the PGW 14 to request deletion of the GTP tunnel.

(Step S39) The PGW 14 sends an "Accounting-Request (stop)" message to the AAA server 22 to request RADIUS deauthentication of the mobile station 11.

(Step S40) The AAA server 22 returns an "Accounting-Response (stop)" message to the PGW 14 as its response to the request for RADIUS deauthentication.

(Step S41) The PGW 14 transmits a "Delete PDP Response" message to the SGW 13 as its response to the request for deletion of the GTP tunnel.

While not illustrated in FIG. 15, the FW 15 keeps track of the above-described RADIUS authentication procedure between the PGW 14 and AAA server 22. For example, the link connection data processing unit 15a in the FW 15 captures IP address of the mobile station 11 by monitoring the actions performed at step S34 of FIG. 15. More specifically, the link connection data processing unit 15a captures a RADIUS packet that contains a code indicating "Accounting-Request (start)" in its code field. This RADIUS packet carries IP address of the requesting mobile station 11 in its attributes field. The link connection data processing unit 15a obtains that IP address and records it in the RADIUS authentication status table 15c, together with a value of "Starting Authentication" in the RADIUS authentication status field.

The link connection data processing unit 15a also observes an Accounting-Response (start) message transmitted at step S36. This event causes the link connection data processing unit 15a to update a relevant record of the RADIUS authentication status table 15c by changing its RADIUS authentication status field from "Starting Authentication" to "Authenticated."

Further, the link connection data processing unit 15a observes the processing at step S39 of FIG. 15, thus obtaining the IP address of the mobile station 11. More specifically, the link connection data processing unit 15a captures a RADIUS packet carrying a code indicating "Accounting-Request (stop)" in its code field. The captured RADIUS packet contains the IP address of the mobile station 11 in its attributes field. The link connection data processing unit 15a uses this IP address to locate a relevant entry in the RADIUS authentication status table 15c and updates the entry by entering "Terminating Authentication" as a new value of its RADIUS authentication status field. The address translation table 15d also contains an entry corresponding to the obtained IP address of the mobile station 11. The link connection data processing unit 15a deletes this entry from the address translation table 15d and transfers the deleted data to the filtering table 15e.

Figure 16:
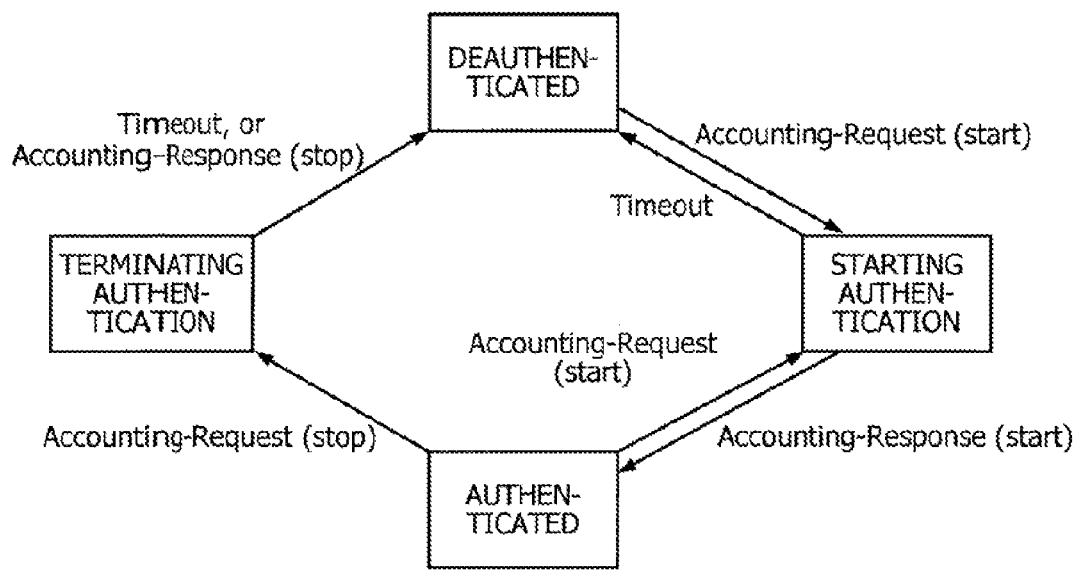
FIG. 16 illustrates state transitions of RADIUS authentication.

FIG. 16 illustrates state transitions of RADIUS authentication. As can be seen from this FIG. 16, the link connection data processing unit 15a may observe an "Accounting-Request (start)" message when the RADIUS authentication is in a "Deauthenticated" state. With this event, the link connection data processing unit 15a recognizes that a RADIUS authentication procedure has started. The authentication status thus changes from "Deauthenticated" state to "Starting Authentication" state.

The link connection data processing unit 15a may observe an "Accounting-Response (start)" message within a specified period after the transition to "Starting Authentication" state. The link connection data processing unit 15a takes this event as completion of the RADIUS authentication procedure, and thus changes the authentication status from "Starting Authentication" state to "Authenticated" state. When, on the other hand, no "Accounting-Response (start)" message is observed within the same specified period, the link connection data processing unit 15a recognizes this timeout event as a state transition back to the "Deauthenticated" state.

The link connection data processing unit 15a may observe an "Accounting-Request (stop)" message during the "Authenticated" state. This event makes the link connection data processing unit 15a recognize that the RADIUS authentication procedure has changed its state from "Authenticated" to "Terminating Authentication." The link connection data processing unit 15a may also observe an "Accounting-Request (start)" message during the "Authenticated" state. The link connection data processing unit 15a interprets this event as a link connection request from a new user's mobile station. The authentication status thus moves to "Starting Authentication" state.

The link connection data processing unit 15a may observe an "Accounting-Response (stop)" message within a specified period after the transition to "Terminating Authentication" state. The link connection data processing unit 15a recognizes this as termination of the RADIUS authentication, and thus the authentication status changes from "Terminating Authentication" state to "Deauthenticated" state. When, on the other hand, no "Accounting-Response (stop)" message is observed within the same specified period, the link connection data processing unit 15a similarly recognizes this timeout event as termination of the RADIUS authentication. The authentication status thus changes from "Terminating Authentication" state to "Deauthenticated" state.

Figure 17:
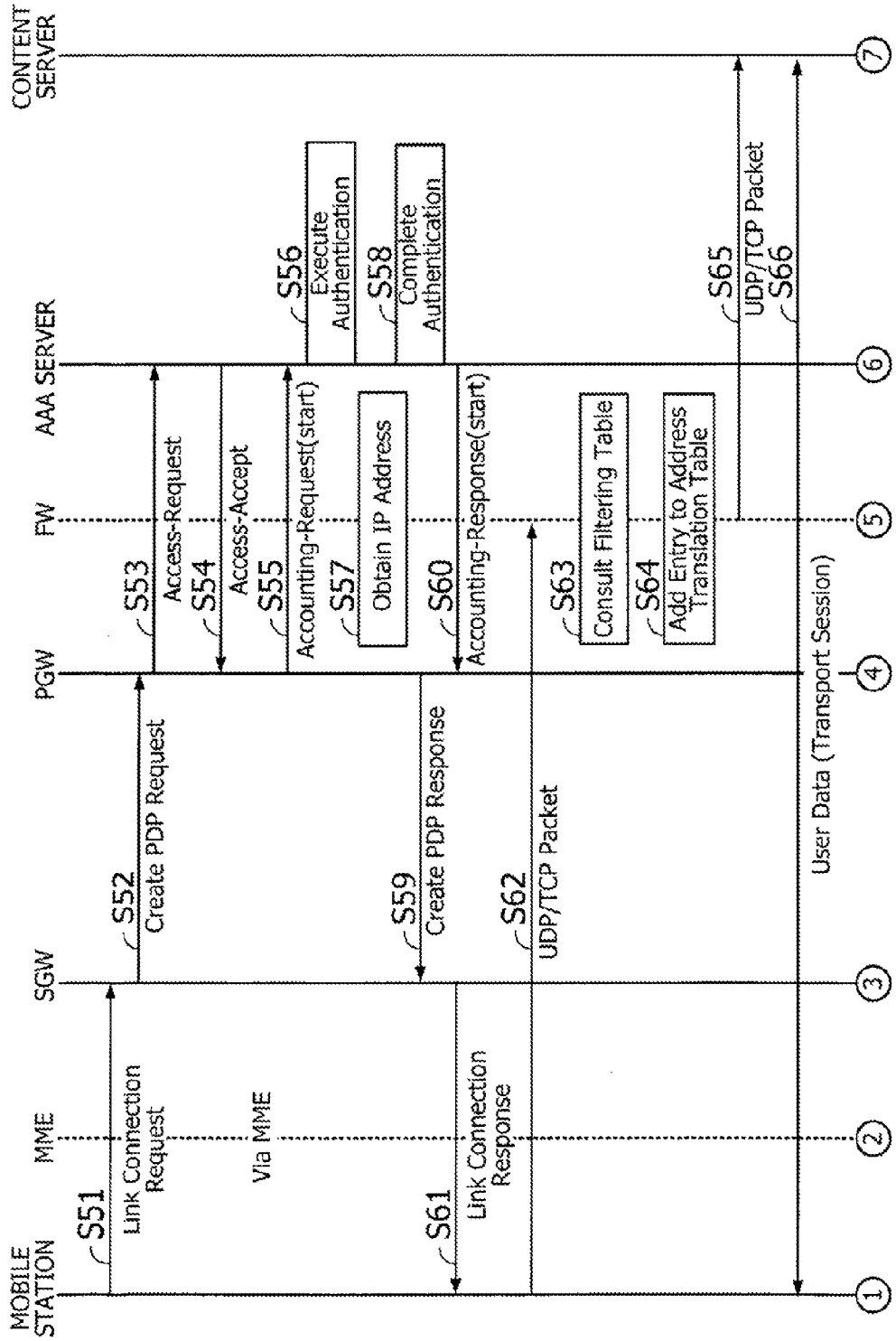
FIGS. 17 and 18 are an exemplary sequence diagram illustrating operation of the network.
Figure 18:
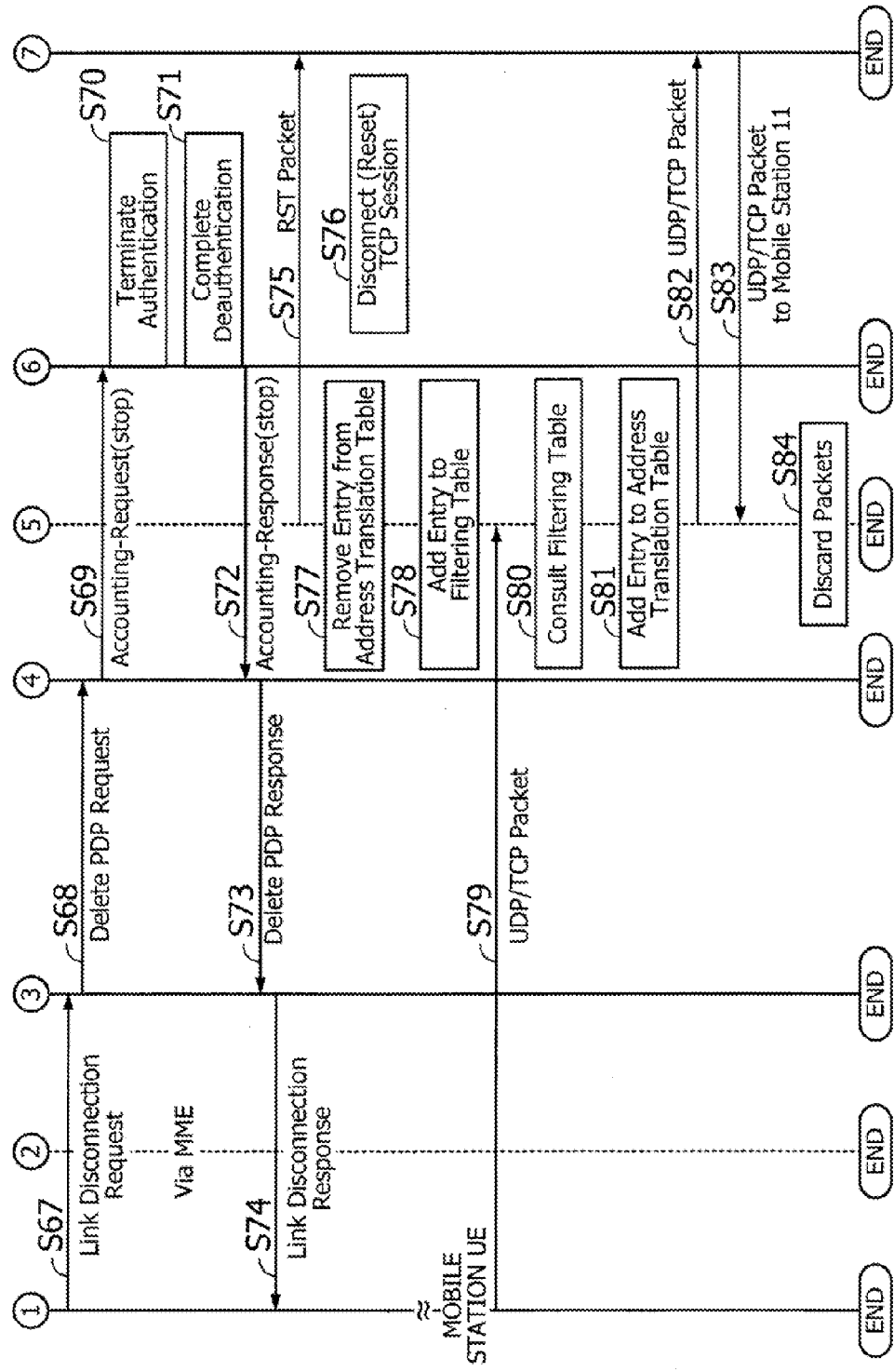

FIGS. 17 and 18 are an exemplary sequence diagram illustrating operation of the network. The illustrated sequence involves most entities discussed in FIG. 3, namely, the mobile station 11, SGW 13, PGW 14, FW 15, MME 16, AAA server 22, and content server 23. Each step of this sequence will be described below in the order of step numbers.

(Step S51) It is assumed here that the mobile station 11 is to make a connection to the MVNO network. To this end, the mobile station 11 sends a link connection request to the SGW 13 via the MME 16.

(Step S52) The SGW 13 sends the PGW 14 a "Create PDP Request" message that requests connection of a GTP tunnel thereto.

(Step S53) Upon receipt of this GTP tunnel connection request from the SGW 13, the PGW 14 transmits an "Access-Request" message to the AAA server 22.

(Step S54) The AAA server 22 responds with an "Access-Accept" message back to the PGW 14 to grant its access request.

(Step S55) The PGW 14 transmits an "Accounting-Request (start)" message to the AAA server 22 to request RADIUS authentication.

(Step S56) In response to the RADIUS authentication request from the PGW 14, the AAA server 22 executes authentication of the requesting mobile station.

(Step S57) The link connection data processing unit 15a in the FW 15 observes the "Accounting-Request (start)" message transmitted at step S55 and captures the IP address of the mobile station 11 from the observed message. The link connection data processing unit 15a updates the RADIUS authentication status table 15c by giving "Starting Authentication" as a new value of its RADIUS authentication status field.

(Step S58) The AAA server 22 completes RADIUS authentication for the requesting mobile station 11.

(Step S59) The PGW 14 transmits a "Create PDP Response" message as a response to the GTP tunnel connection request of the SGW 13, thus establishing a GTP tunnel between the SGW 13 and PGW 14.

(Step S60) The AAA server 22 returns an "Accounting-Response (start)" message to the PGW 14 as its response to the RADIUS authentication request received at step S55. This message permits the mobile station 11 to make access to the MVNO network. Upon observation of the same message, the link connection data processing unit 15a updates the RADIUS authentication status table 15c by giving "Authenticated" as a new value of the RADIUS authentication status field.

(Step S61) The SGW 13 transmits a link connection response back to the requesting mobile station 11 via the MME 16.

(Step S62) The mobile station 11 transmits an initial packet (UDP/TCP packet) to the FW 15.

(Step S63) Upon receipt of the initial packet from the mobile station 11 after RADIUS authentication, the user data processing unit 15b in the FW 15 consults its filtering table 15e.

(Step S64) The user data processing unit 15b translates the IP address and port number of the mobile station 11. Specifically, the user data processing unit 15b assigns an IP address and a port number that are both different from the ones stored in the filtering table 15e consulted at step S63. The user data processing unit 15b creates an entry of the address translation table 15d to make a record of the mobile station 11.

(Step S65) The user data processing unit 15b forwards the initial packet received from the mobile station 11 at step S62, to the content server 23.

(Step S66) The mobile station 11 and content server 23 execute a transport session by transmitting packets to each other.

(Step S67) Suppose that the mobile station 11 now disconnects its link connection to the MVNO network. The mobile station 11 sends a link disconnection request to the SGW 13 via the MME 16.

(Step S68) The SGW 13 sends a "Delete PDP Request" message requesting deletion of the existing GTP tunnel.

(Step S69) The PGW 14 sends an "Accounting-Request (stop)" message to the AAA server 22 to request deauthentication of the mobile station 11. This "Accounting-Request (stop)" message is observed by the link connection data processing unit 15a in the FW 15. Upon this event, the link connection data processing unit 15a updates its RADIUS authentication status table 15c by giving "Terminating Authentication" as a new value of the RADIUS authentication status field.

(Step S70) In response to the RADIUS deauthentication request from the PGW 14, the AAA server 22 deauthenticates the mobile station.

(Step S71) The AAA server 22 completes RADIUS deauthentication of the mobile station.

(Step S72) The AAA server 22 returns an "Accounting-Response (stop)" message to the PGW 14 as its response to the request for RADIUS deauthentication. This "Accounting-Response (stop)" message is observed by the link connection data processing unit 15a in the FW 15. Upon this event, the link connection data processing unit 15a updates its RADIUS authentication status table 15c by giving "Deauthenticated" as a new value of the RADIUS authentication status field.

(Step S73) The PGW 14 transmits a "Delete PDP Response" message to the SGW 13 as its response to the request for deletion of the GTP tunnel.

(Step S74) The SGW 13 transmits a link connection response to the mobile station 11 via the MME 16.

(Step S75) The link connection data processing unit 15a in the FW 15 determines whether there is an active connection of TCP session, by looking into the TCP connection status field of the address translation table 15d. For example, if the TCP connection status field contains a value of LISTEN, SYNSENT, SYNRCVD, or ESTAB, then it indicates that there is an active TCP connection. When this is the case, the link connection data processing unit 15a transmits an RST packet of the TCP protocol to the remote device (e.g., content server 23) registered in the address translation table 15d.

(Step S76) Upon receipt of the RST packet from the FW 15, the content server 23 disconnects, or resets, its current TCP session with the mobile station 11.

(Step S77) The link connection data processing unit 15a removes the entry of the mobile station 11 from the address translation table 15d.

(Step S78) Now that the mobile station 11 is unregistered from the address translation table 15d, the link connection data processing unit 15a adds the removed data of the mobile station 11 as an entry of the filtering table 15e. The link connection data processing unit 15a may be designed to delete this entry of the mobile station 11 from the filtering table 15e upon expiration of, for example, a time period specified by the administrator. This time period may be longer than a session timeout period of the content server 23.

(Step S79) It is assumed now that there is another mobile station UE than the mobile station 11, which makes a link connection to the MVNO network. It is also assumed that the mobile station UE is assigned by the PGW 14 the same IP address as the one previously assigned to the mobile station 11, and its RADIUS authentication is successfully finished. In other words, the mobile station UE has done the above-described processing of step S51 to S61 similarly to the mobile station 11. The mobile station UE now sends an initial packet to the FW 15.

(Step S80) Upon receipt of the initial packet from the mobile station UE after RADIUS authentication, the user data processing unit 15b in the FW 15 consults its filtering table 15e.

(Step S81) The user data processing unit 15b translates the IP address and port number of the mobile station UE. Specifically, the user data processing unit 15b assigns an IP address and a port number that are both different from the ones stored in the filtering table 15e consulted at step S80. The user data processing unit 15b creates an entry of the address translation table 15d to make a record of the mobile station UE.

As mentioned in the above description of step S79, the mobile station UE has been assigned the same IP address as the one previously assigned to the mobile station 11, meaning that the filtering table 15e has an existing entry for that IP address of the mobile station 11. Accordingly, the user data processing unit 15b assigns the mobile station UE a different IP address from the mobile station 11's as its translated IP address. The link connection data processing unit 15a removes the above entry of the mobile station 11 from the filtering table 15e because its IP address now belongs to other mobile station UE.

(Step S82) The user data processing unit 15b forwards the initial packet received from the mobile station UE at step S79, to the content server 23.

(Step S83) No packets are supposed to be transmitted from the content server 23 to the mobile station 11 because their session has already been disconnected. However, it is assumed here that the content server 23 still keeps a session connection with the mobile station 11 and thus transmits packets to the mobile station 11.

(Step S84) As a result of the processing performed at step S77, the address translation table 15d has no entries for the mobile station 11. The user data processing unit 15b in the FW 15 therefore discards packets addressed to the mobile station 11. That is, the hypothetical packet transmission at step S83 from the content server 23 to the mobile station 11 does not reach the mobile station UE in spite of their identical IP addresses, since the mobile station 11 has no link connection to the MVNO network. This is also true for UDP packets. The address translation table 15d and filtering table 15e prevent UDP packets from being transmitted to the mobile station 11 that has no link connection to the MVNO network. In contrast, user data addressed to the mobile station UE is delivered to their intended destination (unlike those addressed to the mobile station 11) because the processing at step S81 has produced an entry of the mobile station UE in the address translation table 15d.

As can be seen from the above, the link connection data processing unit 15a in the FW 15 monitors RADIUS authentication procedures performed when a mobile station 11 makes a link connection to the MVNO network, as well as when it disconnects that link. The link connection data processing unit 15a is designed to produce an RST packet to disconnect the session of the mobile station 11 based on its observation on the RADIUS authentication. With these features, the FW 15 disconnects the session of the mobile station 11 after its link connection to the MVNO network is nullified.

By disconnecting such sessions of the mobile station 11, the FW 15 protects the content server 23 against resource exhaustion attacks by an unauthorized user. For example, in the case where the session of the mobile station 11 is still alive in spite of link disconnection, some unauthorized user would be able to attack the content server 23 by repeating connection and disconnection of a link to the MVNO network. This attack increases the number of sessions in the content server 23, which exhausts session resources and thus hampers other users from establishing their own sessions. The above-described FW 15, on the other hand, automatically disconnects each session of the mobile station 11, thus protecting the content server 23 against such resource exhaustion attacks by an unauthorized user.

It is also noted that the user data processing unit 15b in the above-described FW 15 employs a filtering table 15e, together with an address translation table 15d, not to assign a new mobile station UE the same translated IP address as the one previously assigned to the mobile station 11. This feature of the user data processing unit 15b prevents data requested by one user from being sent to another user's mobile station UE and, accordingly, protects the latter user from receiving a bill that is not pertinent to him or her.

The content server 23 may be connected to the Internet. For example, the GW 21 may be able to access the Internet, on which the content server 23 is deployed.

(c) Third Embodiment

This section describes a third embodiment in detail with reference to the accompanying drawings. The foregoing first and second embodiments disconnect sessions according to observation of RADIUS authentication activities. In contrast, the third embodiment is designed to disconnect sessions on the basis of the status of data-carrying links in a radio access network.

Figure 19:
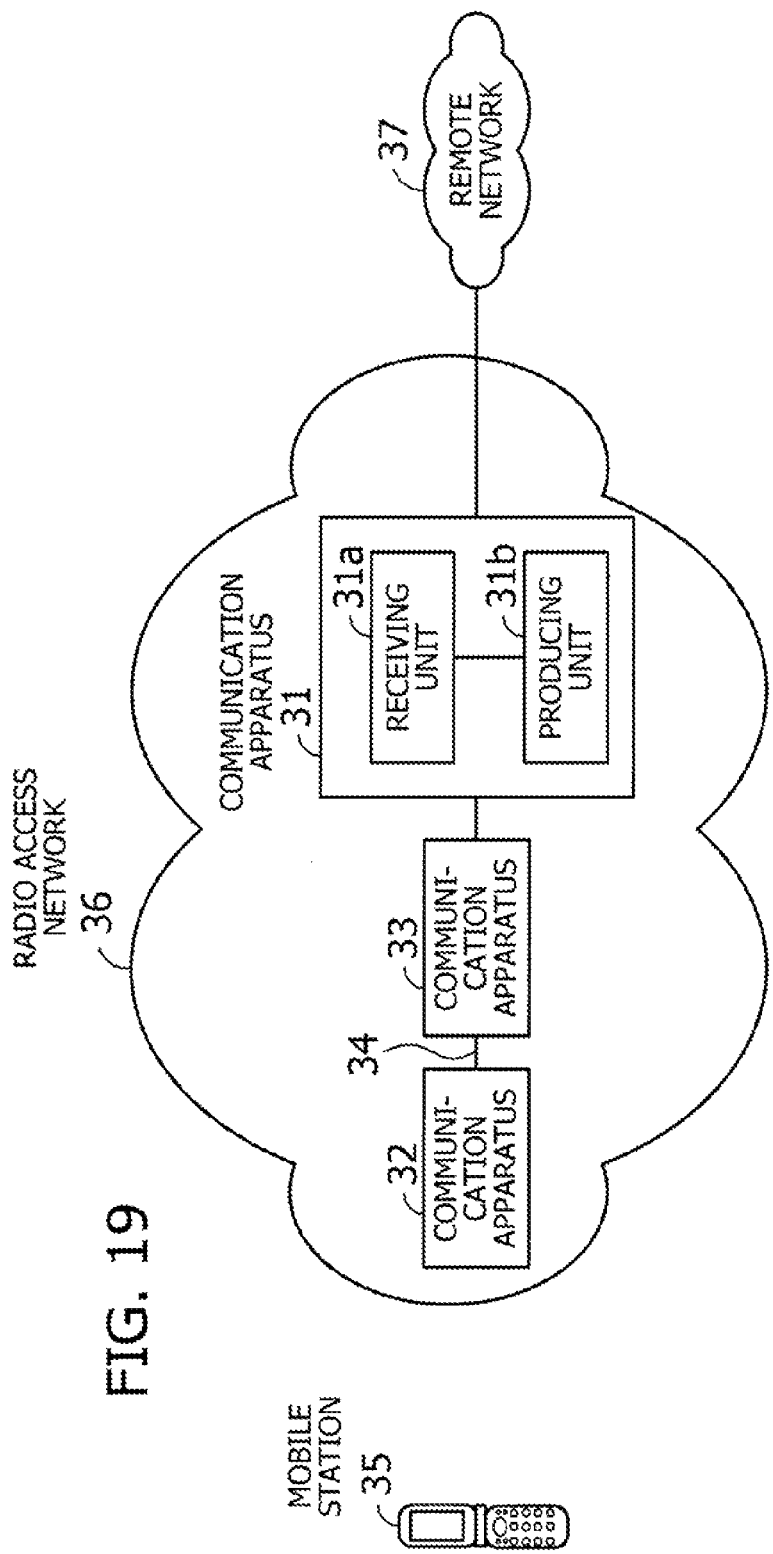
FIG. 19 illustrates communication apparatuses according to a third embodiment.

FIG. 19 illustrates communication apparatuses according to a third embodiment. As can be seen, one communication apparatus 31 is located in a radio access network 36, which may be an LTE network, for example. This radio access network 36 is linked to another network 37 (referred to herein as a "remote network") such as an MVNO network. The communication apparatus 31 may be, for example, a firewall that relays data transmission between a mobile station 35 and the remote network 37.

The mobile station 35 may be, for example, a cellular phone or other wireless communication device. The mobile station 35 is allowed to reach the remote network 37 via the communication apparatus 31 by using a radio link to an eNB (not illustrated) deployed in the radio access network 36.

Another communication apparatus 32 is deployed as part of the radio access network 36 to route data to and from the mobile station 35. This communication apparatus 32 may be, for example, an SGW that connects eNBs (not illustrated) to yet another communication apparatus 33. The communication apparatus 33 is deployed as part of the radio access network 36 to route data to and from the mobile station 35. This communication apparatus 33 may be, for example, a PGW that connects the communication apparatuses 31 and 32.

There is formed a link 34 between two communication apparatuses 32 and 33, which may be, for example, a GTP tunnel to convey data to and from the mobile station 35. For example, this link 34 between the communication apparatuses 32 and 33 may be formed in response to a link connection request from the mobile station 35 attempting to reach the remote network 37. The link 34 may be disconnected in response to a link disconnection request from the mobile station 35 to the remote network 37.

The communication apparatus 31 includes a receiving unit 31a and a producing unit 31b. The receiving unit 31a receives information indicating the status of the link 34 between communication apparatuses 32 and 33. For example, this information may indicate whether the link 34 between the communication apparatuses 32 and 33 is in a connected state or a disconnected state. The receiving unit 31a may receive such information from the latter communication apparatus 33.

The producing unit 31b produces information used to disconnect a session of the mobile station 35 based on the status information about the link 34 that is received by the receiving unit 31a. When, for example, the status information received by the receiving unit 31a indicates disconnection of the link 34, the producing unit 31b produces an RST packet for disconnecting a session of the mobile station 35.

The information (RST packet) produced by the producing unit 31b is transmitted to, for example, a content server that has a session established with the mobile station 35. This transmission causes disconnection of the ongoing session of the mobile station 35 (more precisely, the session between the mobile station 35 and content server).

As can be seen from the above, the communication apparatus 31 according to the third embodiment has a receiving unit 31a to receive information indicating the status of a link 34 between communication apparatuses 32 and 33, and a producing unit 31b to produce information for disconnecting a session of the mobile station 35 based on the information received by the receiving unit 31a. These features of the communication apparatus 31 make it possible to disconnect a session of the mobile station 35 subsequently to disconnection of its link to the remote network 37.

(d) Fourth Embodiment

Figure 20:
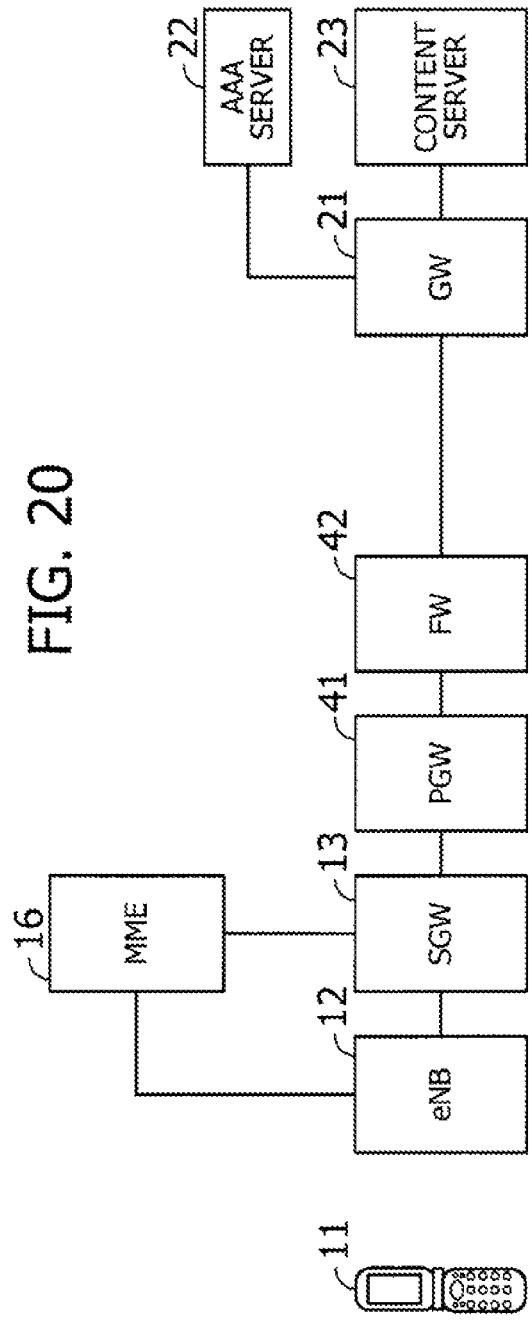
FIG. 20 illustrates an exemplary network configuration that involves a communication apparatus according to a fourth embodiment.

This section describes a fourth embodiment in detail with reference to the accompanying drawings. FIG. 20 illustrates an exemplary network configuration that involves a communication apparatus according to the fourth embodiment. Specifically FIG. 20 depicts layer-3 connections between an LTE network and an MVNO network. FIG. 20 shares some reference numerals with FIG. 2 to designate similar elements. See previous explanation for those elements.

The illustrated network system of the fourth embodiment includes a PGW 41 and an FW 42. While being similar to the PGW 14 discussed in FIG. 2, the PGW 41 is different in that it informs the FW 42 of the status of a GTP tunnel formed between the PGW 41 and SGW 13. The FW 42, while being similar to the FW 15 discussed in FIG. 2, is different in that it receives information on the GTP tunnel from the preceding PGW 41 and produces an RST packet based on the received information.

The exemplary network of FIG. 20 operates in a similar way to that discussed previously in FIG. 3. See the preceding description, for details of the operation.

Figure 21:
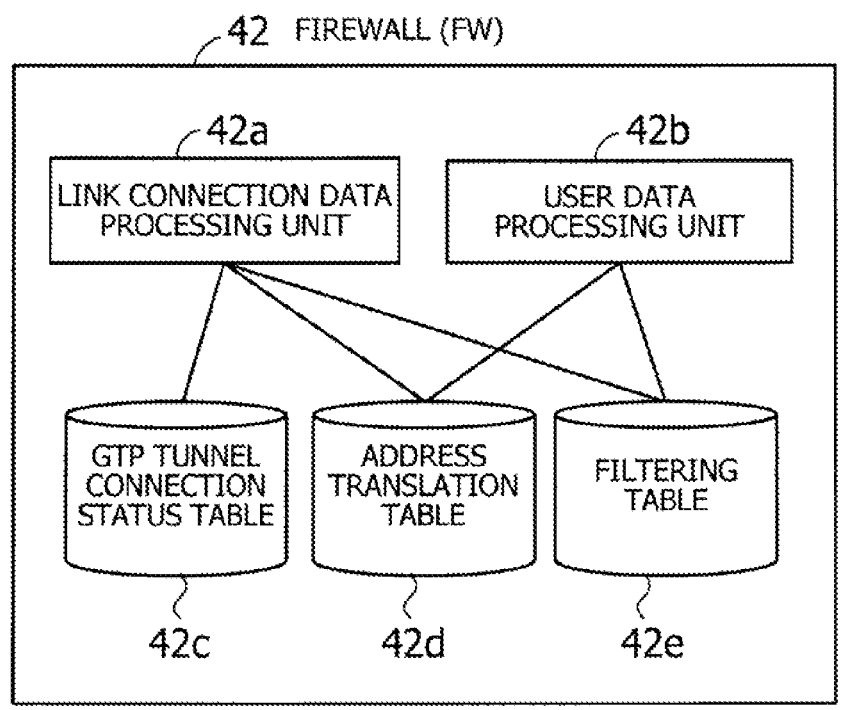
FIG. 21 is an exemplary functional block diagram of a firewall.

FIG. 21 is an exemplary functional block diagram of a firewall. As seen, the illustrated FW 42 includes a link connection data processing unit 42a, a user data processing unit 42b, a GTP tunnel connection status table 42c, an address translation table 42d, and a filtering table 42e. The link connection data processing unit 42a performs data processing operation for a mobile station 11 to make a link connection. During the course of this processing, the link connection data processing unit 42a makes access to the GTP tunnel connection status table 42c, address translation table 42d, and filtering table 42e. The user data processing unit 42b manipulates user data of the mobile station 11 after it is recognized as a legitimate user of the MVNO network. For example, the user data processing unit 42b performs NAPT processing with reference to the address translation table 42d and filtering table 42e.

Referring again to FIG. 20, the PGW 41 is formed from functional blocks similar to those discussed in FIG. 4. In the case of the PGW 41, however, its GTP tunnel control unit 14a is configured to inform the FW 42 of the status of GTP tunnels.

The FW 42 is built on a hardware platform discussed in FIG. 7. For details of the hardware configuration of the FW 42, see the description of FIG. 7.

FIG. 22 illustrates an exemplary data structure of a GTP tunnel connection status table. As seen, the illustrated GTP tunnel connection status table 42c is formed from the following data fields: "ID," "Mobile Station IP address," "Tunnel Endpoint Identifier (TEID)," and "GTP Tunnel Connection Status."

The ID field contains an identifier for distinguishing each data record stored in the GTP tunnel connection status table 42c. The mobile station IP address field contains an IP address that the PGW 41 has assigned to a mobile station 11. The TEID field contains a TEID indicating a specific GTP tunnel created between the SGW 13 and PGW 41. The GTP tunnel connection status field indicates the status of connection of the GTP tunnel of the mobile station 11. For example, this GTP tunnel connection status field may take a value of "No Connection," "Starting Connection," "Connected," or "Terminating Connection."

Suppose, for example, that the mobile station 11 has issued a link connection request to the MVNO network. The SGW 13 then transmits a GTP tunnel connection request to the PGW 41. In response to this request, the PGW 41 sends information to the FW 42 that indicates the beginning of a process to establish a GTP tunnel with the SGW 13. The information includes an IP address assigned to the mobile station 11 and TEID of the GTP tunnel to be created.

Upon receipt of the IP address and TEID from the PGW 41, the link connection data processing unit 42a in the FW 42 stores them in the mobile station IP address field and TEID field of the GTP tunnel connection status table 42c. The link connection data processing unit 42a further assigns an identifier to that IP address stored in the mobile station IP address field and puts it in its corresponding ID field. In addition, the link connection data processing unit 42a updates the GTP tunnel connection status field with a value of "Starting Connection."

The PGW 41 connects a GTP tunnel to the SGW 13 and returns a response to the GTP tunnel connection request. The PGW 41 then informs the FW 42 of completion of the GTP tunnel connection. Upon receipt of this information from the PGW 41, the link connection data processing unit 42a in the FW 42 stores "Connected" as a new value of the GTP tunnel connection status field.

Afterwards the mobile station 11 may request disconnection of its link to the MVNO network. The SGW 13 transmits a GTP tunnel disconnection request to the PGW 41. In response to this request, the PGW 41 notifies the FW 42 that it is disconnecting a GTP tunnel, besides sending the IP address of the mobile station 11. Upon receipt of the IP address from the PGW 41, the link connection data processing unit 42a in the FW 42 gives "Terminating Connection" as a new value of the GTP tunnel connection status field corresponding to the IP address.

The PGW 41 disconnects the GTP tunnel to the SGW 13 and returns a response to its GTP tunnel disconnection request. The PGW 41 then informs the FW 42 of completion of the GTP tunnel disconnection. Upon receipt of this information from the PGW 41, the link connection data processing unit 42a in the FW 42 stores "No Connection" as a new value of the GTP tunnel connection status field.

Referring back to FIG. 21, the address translation table 42d and filtering table 42e are similar to the address translation table 15d discussed in FIG. 9 and the filtering table 15e discussed in FIG. 10, respectively. For details of these tables, see the preceding description of FIGS. 9 and 10.

Figure 23:
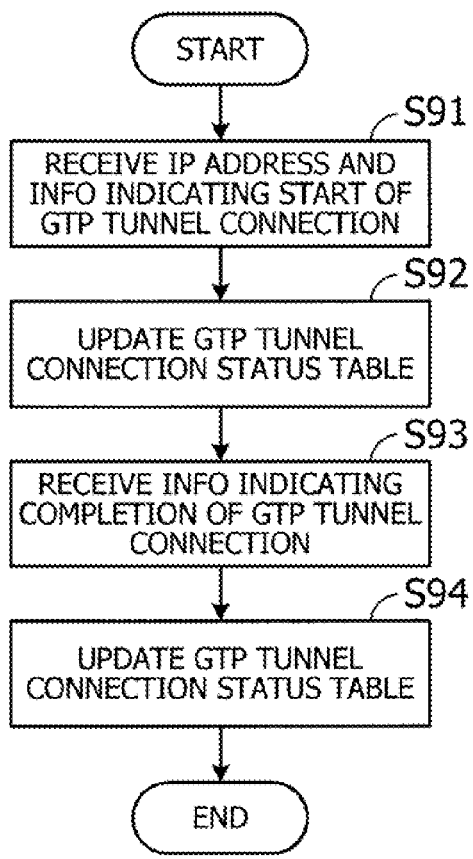
FIG. 23 is a flowchart illustrating operation of a link connection data processing unit according to the fourth embodiment.

FIG. 23 is a flowchart illustrating operation of the link connection data processing unit 42a according to the fourth embodiment. This flowchart of FIG. 23 illustrates how a GTP tunnel connection is established between the SGW 13 and PGW 41. Each step of the flowchart will be described below in the order of step numbers.

(Step S91) The link connection data processing unit 42a receives information from the PGW 41 that indicates the beginning of a process to connect a GTP tunnel for a mobile station 11. This information includes IP address of the mobile station 11 and TEID of the GTP tunnel to be created.

(Step S92) Upon receipt of the IP address and TEID from the PGW 41, the link connection data processing unit 42a stores them in the mobile station IP address field and TEID field of the GTP tunnel connection status table 42c. In addition, the link connection data processing unit 42a updates the GTP tunnel connection status field with a value of "Starting Connection."

(Step S93) The link connection data processing unit 42a receives information from the PGW 41 that indicates completion of the GTP tunnel connection.

(Step S94) The link connection data processing unit 42a updates the GTP tunnel connection status table 42c by giving "Connected" as a new value of its GTP tunnel connection status field.

Figure 24:
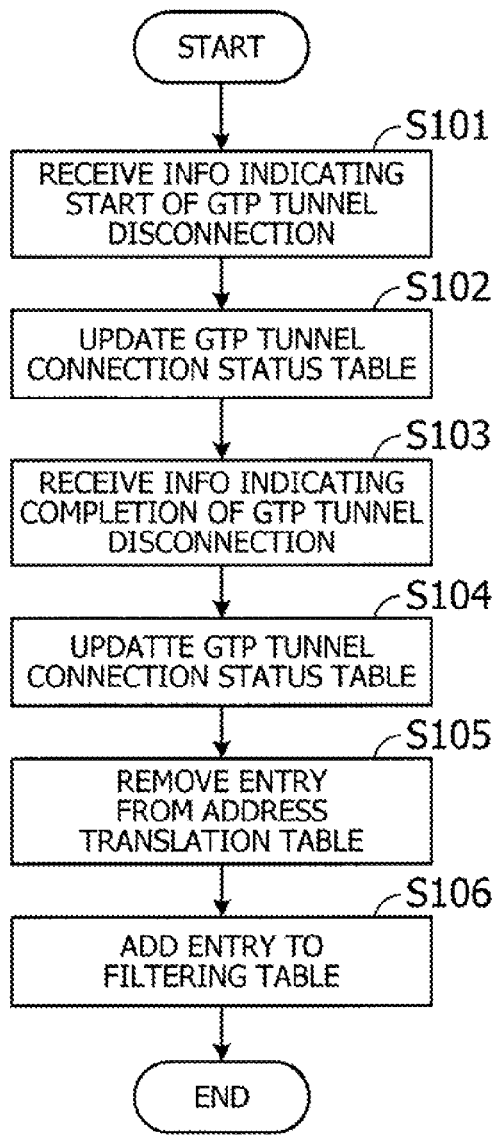
FIG. 24 is another flowchart illustrating operation of the link connection data processing unit according to the fourth embodiment.

FIG. 24 is another flowchart illustrating operation of the link connection data processing unit 42a according to the fourth embodiment. This flowchart of FIG. 24 illustrates how the link connection data processing unit 42a disconnects an existing GTP tunnel between the SGW 13 and PGW 41.

(Step S101) The link connection data processing unit 42a receives information from the PGW 41 that indicates the beginning of a process to disconnect an existing GTP tunnel.

(Step S102) The link connection data processing unit 42a updates the GTP tunnel connection status table 42c by giving "Terminating Connection" as a new value of its GTP tunnel connection status field.

(Step S103) The link connection data processing unit 42a receives information from the PGW 41 that indicates completion of the GTP tunnel disconnection.

(Step S104) The link connection data processing unit 42a updates the GTP tunnel connection status table 42c by giving "No Connection" as a new value of its GTP tunnel connection status field. The link connection data processing unit 42a may also produce an RST packet of the TCP protocol in the case where the address translation table 42d indicates a "TCP Connected" state in its TCP connection status field. The RST packet contains a sequence number and an ACK number which are copied from the SEQ number field and ACK number field of the address translation table 42d. The produced RST packet is transmitted to the content server 23 with which the mobile station 11 has been communicating in the current session. The content server 23 receives this RST packet and checks its sequence number and ACK number. If the received sequence and ACK numbers match with what are expected, the content server 23 disconnects the current session with the mobile station 11.

(Step S105) The link connection data processing unit 42a removes the entry of the mobile station 11 from its address translation table 42d.

(Step S106) Now that the mobile station 11 is unregistered from the address translation table 42d, the link connection data processing unit 42a adds the removed data of the mobile station 11 as an entry of the filtering table 42e.

Figure 25:
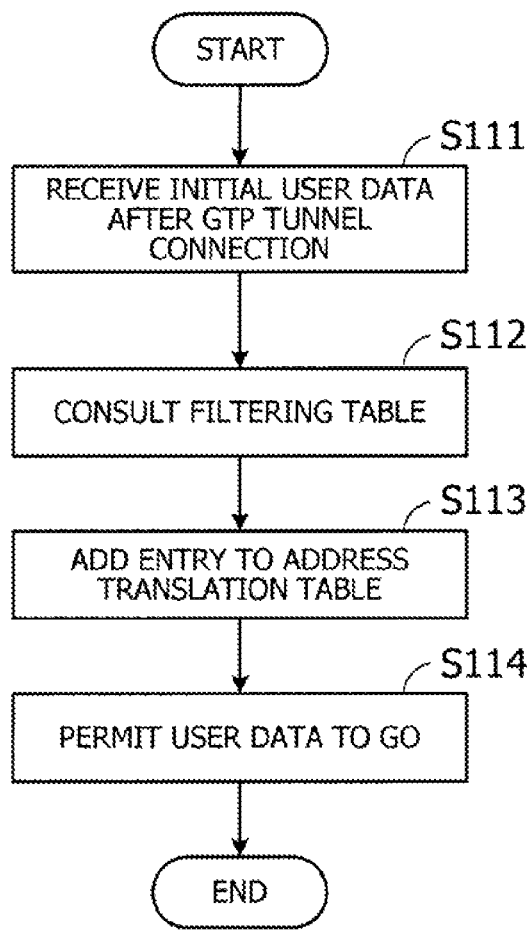
FIG. 25 is a flowchart illustrating operation of a user data processing unit according to the fourth embodiment.

FIG. 25 is a flowchart illustrating operation of the user data processing unit 15b according to the fourth embodiment. Each step of the flowchart will be described below in the order of step numbers.

(Step S111) The user data processing unit 15b receives initial user data transmitted from the mobile station 11 or content server 23 in the first place after GTP tunnel connection.

(Step S112) The user data processing unit 42b consults the filtering table 42e.

(Step S113) The user data processing unit 42b translates the IP address and port number of the mobile station 11. Specifically, the user data processing unit 42b assigns an IP address and a port number that are both different from the ones stored in the filtering table 42e consulted at step S112.

(Step S114) The user data processing unit 42b permits the user data from the mobile station 11 or content server 23 to make its way to the destination. For subsequent user data, the user data processing unit 42b only forwards those for the connected GTP tunnel, while discarding other data.

Figure 26:
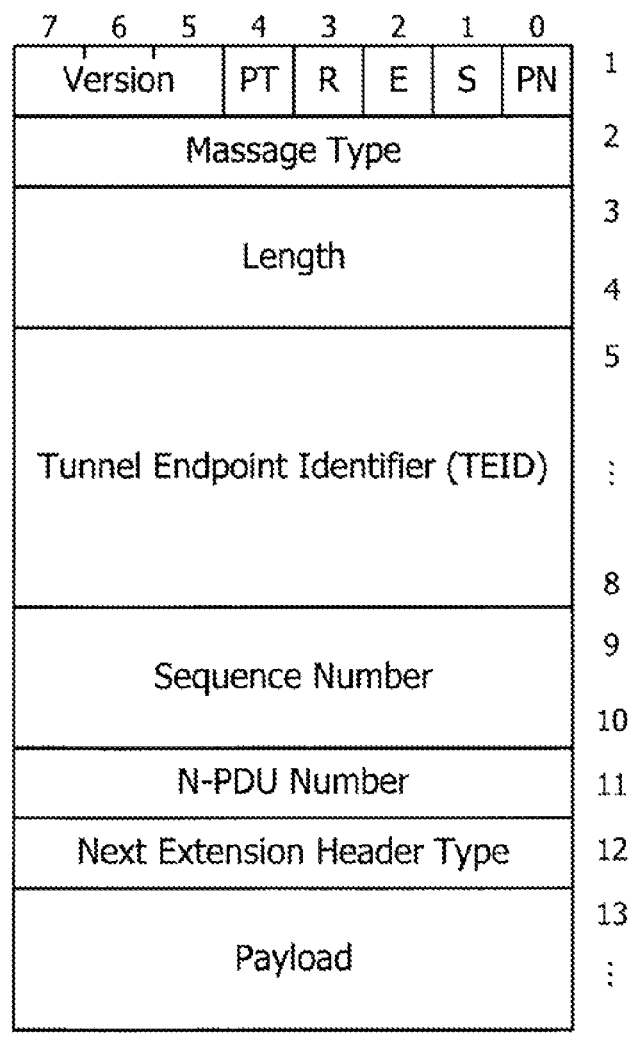
FIG. 26 illustrates a GTP-C packet.

FIG. 26 illustrates a GTP Control Plane (GTP-C) packet. The SGW 13 and PGW 41 transmit and receive such GTP-C packets when connecting or disconnecting a GTP tunnel for the mobile station 11. As illustrated in FIG. 26, the GTP-C packet is formed from the following data fields: "Version," "PT," "R" (Reserve), "E" (extension header flag), "S" (sequence number flag), "PN" (Protocol Data Unit (N-PDU) Number flag), "Message Type," "Length," "TEID," "Sequence Number," "N-PDU Number," "Next Extension Header Type," and "Payload."

The version field indicates the version of GTP. The PT field contains a bit that indicates which type of GTP protocol is used. The R field is a reserved field. The E field contains a bit that indicates whether there is an extension header optional field. The S field contains a bit that indicates whether there is a Sequence Number optional field. The PN field contains a bit indicating whether there is an N-PDU number optional field. The message type field contains information that indicates the type of GTP message. The length field contains information that indicates the length of Payload field. The TEID field contains an identifier used to discriminate different link connections from each other. An identifier is designated each time a new link connection is established. The sequence number field contains a transaction ID that is used to associate a request with a response in the GTP-C protocol. The N-PDU number field contains an N-PDU number. The next extension header type field contains information that indicates whether there follows an optional extension field, and what type of extension it is. The payload field is used to store parameters that are specific to each GTP-C message.

The SGW 13 and PGW 41 allocate TEIDs when they build a new GTP tunnel. For example, the SGW 13 provides a TEID of a GTP tunnel extending from SGW 13 to PGW 41. The PGW 41 provides a TEID for a GTP tunnel extending from PGW 41 to SGW 13. The PGW 41 and SGW 13 transmit those TEIDs to each other, putting them into the TEID field of GTP-C packets. The foregoing GTP tunnel connection status table 42c may contain a TEID allocated by the SGW 13 in its TEID field, or may contain a TEID allocated by the PGW 41 in the same. It is also possible for the GTP tunnel connection status table 42c to contain both TEIDs in its TEID field.

Suppose that the PGW 41 has allocated an IP address for a mobile station 11. The SGW 13 may be able to obtain this IP address from a received GTP-C packet when all the following three conditions are met: (a) the message type field of the GTP-C packet indicates "Create Session Response," (b) the payload field contains a "Cause" parameter indicating "Request Accepted," and (c) an IP address is set to PDN Address Allocation. The PGW 41 may similarly be able to obtain the IP address of the mobile station 11 from a received GTP-C packet in the case where the SGW 13 has allocated that IP address.

Figure 27:
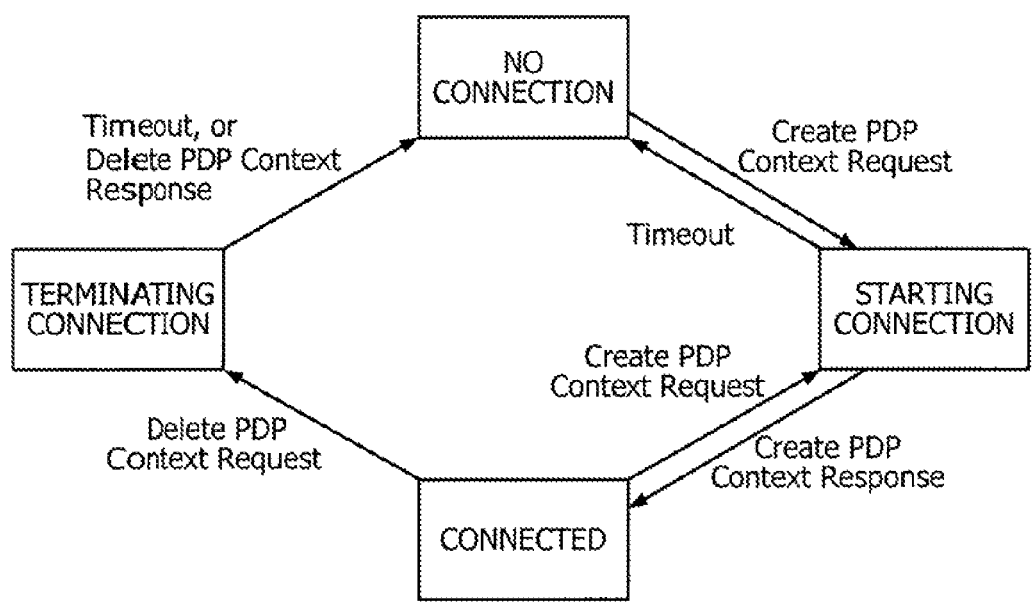
FIG. 27 illustrates state transitions of GTP tunnel connection.

FIG. 27 illustrates state transitions of GTP tunnel connection. As seen in FIG. 27, the link connection data processing unit 42a may receive a "Create PDP Context Request" message from the PGW 41 when the GTP tunnel is in "No Connection" state. This event causes the GTP tunnel connection status to move into "Starting Connection" state.

The link connection data processing unit 42a may receive a "Create PDP Context Response" message from the PGW 41 in a specified time period after the transition to "Starting Connection" state. The link connection data processing unit 42a interprets this event as a change of the GTP tunnel connection status to "Connected" state. When, on the other hand, there is no Create PDP Context Response message in the same specified time period, the link connection data processing unit 42a determines that the GTP tunnel connection status has returned to the "No Connection" state.

The link connection data processing unit 42a may receive a "Delete PDP Context Response" message from the PGW 41 when the GTP tunnel is in "Connected" state. This event changes the GTP tunnel connection status to "Terminating Connection" state. The link connection data processing unit 42a may also receive a "Create PDP Context Response" message from the PGW 41 when the GTP tunnel is in "Connected" state. The link connection data processing unit 42a interprets this event as the presence of a link connection request from a new user's mobile station, thus changing the GTP tunnel connection status to "Starting Connection" state.

The link connection data processing unit 42a may receive a "Delete PDP Context Response" message from the PGW 41 in a specified time period after the transition to "Terminating Connection" state. The link connection data processing unit 42a interprets this event as a change of the GTP tunnel connection status to "No Connection" state. In the case where there is no "Delete PDP Context Response" message from the PGW 41 in the same specified time period, the link connection data processing unit 42a also interprets this timeout event as a change of the GTP tunnel connection status to "No Connection" state.

Figure 28:
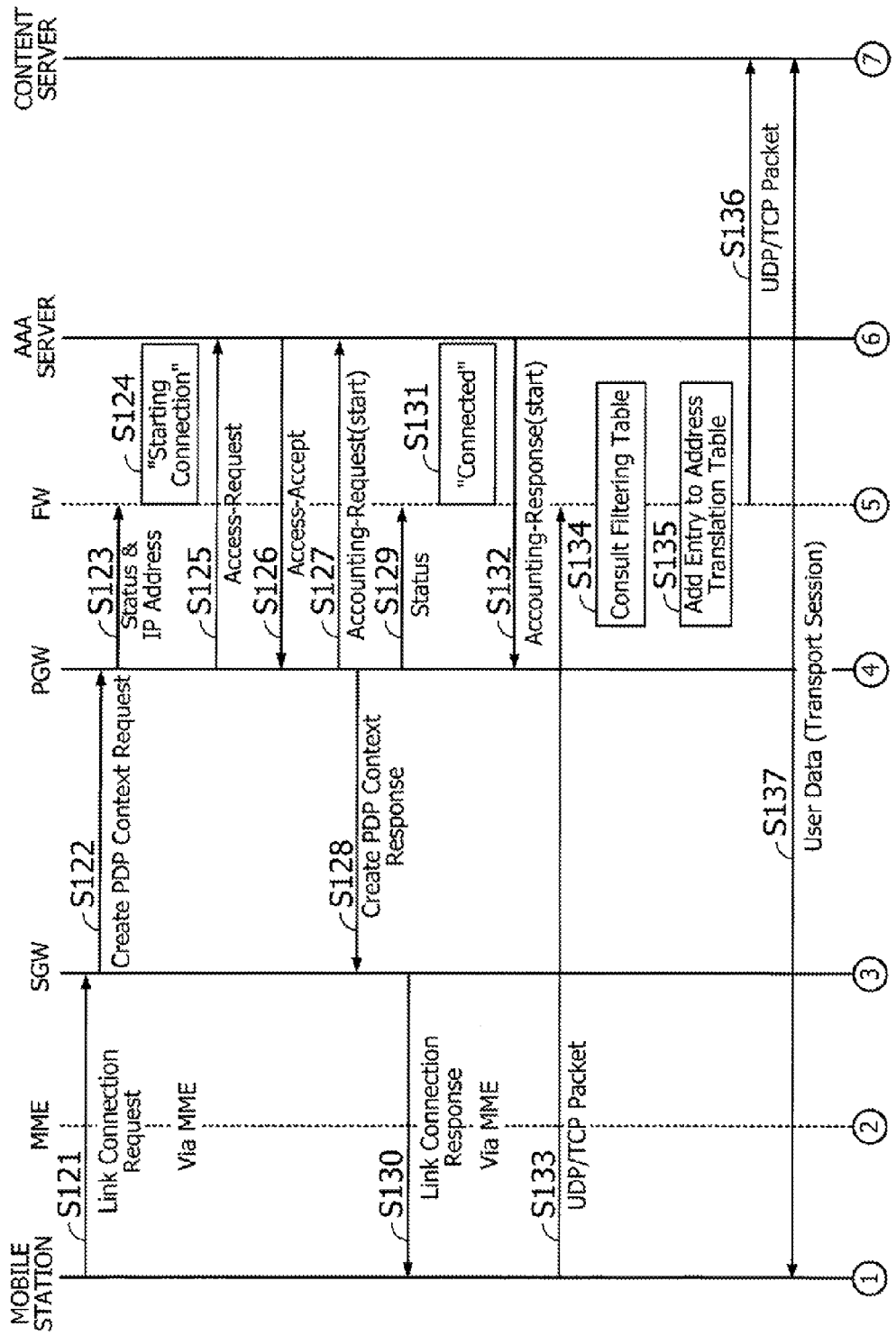
FIGS. 28 and 29 are an exemplary sequence diagram illustrating operation of the network according to the fourth embodiment.
Figure 29:
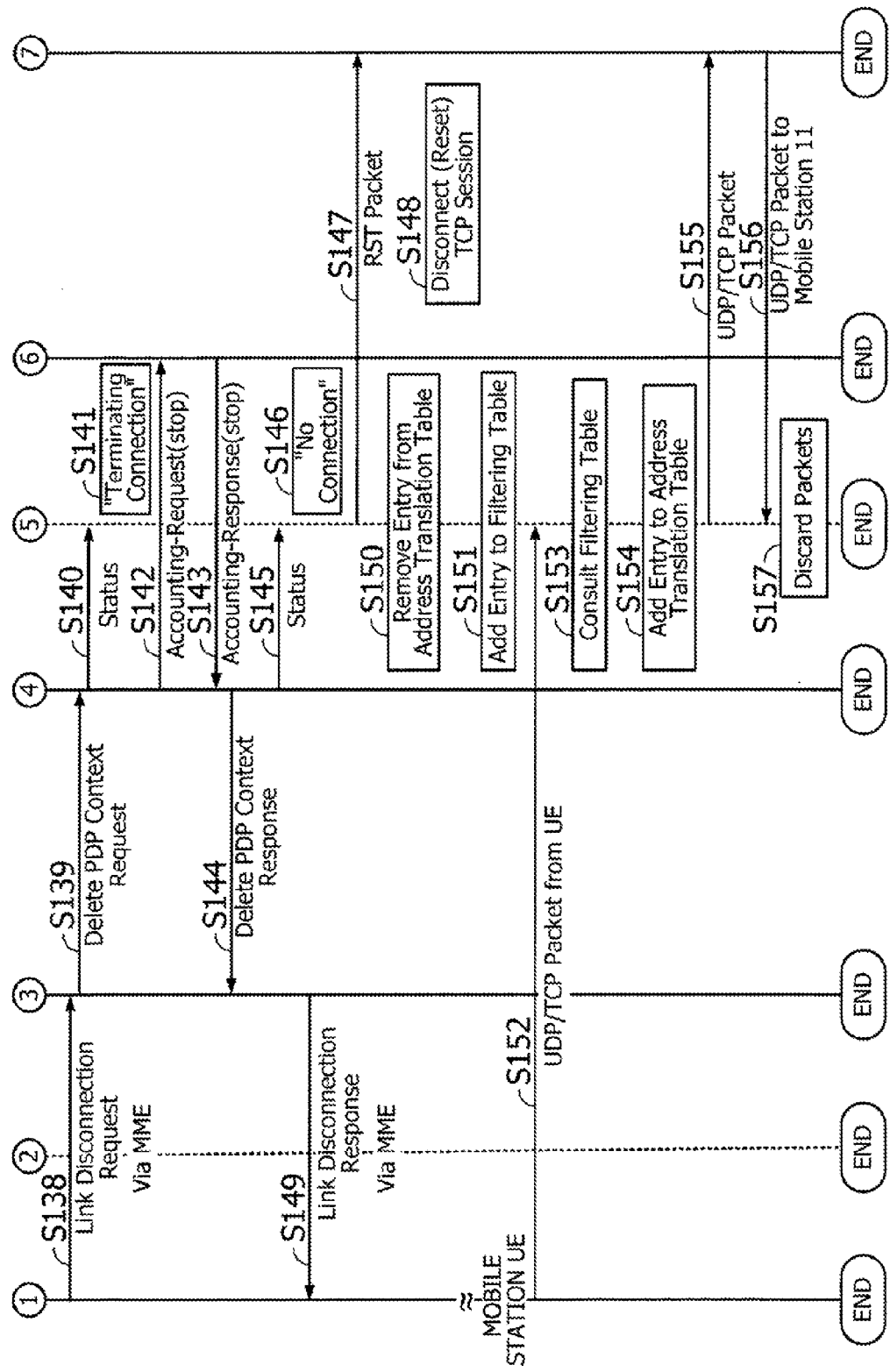

FIGS. 28 and 29 are an exemplary sequence diagram illustrating operation of the network system. The illustrated sequence involves most entities discussed in FIG. 20, namely, the mobile station 11, SGW 13, MME 16, AAA server 22, content server 23, PGW 41, and FW 42. Each step of the flowchart will be described below in the order of step numbers.

(Step S121) It is assumed here that the mobile station 11 is to make a connection to the MVNO network. To this end, the mobile station 11 sends a link connection request to the SGW 13 via the MME 16.

(Step S122) To build a GTP tunnel to the PGW 41, the SGW 13 sends a "Create PDP Request" message requesting connection of a GTP tunnel.

(Step S123) In response to the connection request from the SGW 13, the PGW 41 informs the FW 42 of the current state of GTP tunnel connection (i.e., the beginning of a process to establish a GTP tunnel), as well as of IP address and TEID pertinent to the connection.

(Step S124) Upon receipt of the information about GTP tunnel connection from the PGW 41, the link connection data processing unit 42a in the FW 42 updates the GTP tunnel connection status table 42c by giving "Starting Connection" as a new value of its GTP tunnel connection status field. The link connection data processing unit 42a also stores the received IP address and TEID respectively in the mobile station IP address field and TEID field of the GTP tunnel connection status table 42c.

(Step S125) Upon receipt of the GTP tunnel connection request from the SGW 13, the PGW 41 transmits an "Access-Request" message to the AAA server 22.

(Step S126) The AAA server 22 responds with an "Access-Accept" message back to the PGW 41 to grant its access request.

(Step S127) The PGW 41 transmits an "Accounting-Request (start)" message to the AAA server 22 to request RADIUS authentication.

(Step S128) The PGW 41 transmits a "Create PDP Response" message as a response to the GTP tunnel connection request of the SGW 13, thus establishing a GTP tunnel between the SGW 13 and PGW 41.

(Step S129) The PGW 41 informs the FW 42 of completion of the GTP tunnel connection.

(Step S130) The SGW 13 transmits a link connection response back to the requesting mobile station 11 via the MME 16.

(Step S131) Being informed of the completion of GTP tunnel connection at step S129, the link connection data processing unit 42a in the FW 42 updates the GTP tunnel connection status table 42c by giving "Connected" as a new value of its GTP tunnel connection status field. Specifically, the link connection data processing unit 42a has received IP address of the mobile station 11 at step S129. The link connection data processing unit 42a thus gives "Connected" in the GTP tunnel connection status field of an entry corresponding the received IP address.

(Step S132) The AAA server 22 returns an "Accounting-Response (start)" message to the PGW 41 as its response to the RADIUS authentication request. This message permits the mobile station 11 to make access to the MVNO network.

(Step S133) The mobile station 11 sends an initial packet (UDP/TCP packet) to the FW 42.

(Step S134) Upon receipt of the initial packet from the mobile station 11 after RADIUS authentication, the user data processing unit 42b in the FW 42 consults the filtering table 42e.

(Step S135) The user data processing unit 42b translates the IP address and port number of the mobile station 11. Specifically, the user data processing unit 42b assigns an IP address and a port number that are both different from the ones stored in the filtering table 42e consulted at step S134. The user data processing unit 42b creates an entry of the address translation table 42d to make a record of the mobile station 11.

(Step S136) The user data processing unit 42b forwards the initial packet received from the mobile station 11 at step S133, to the content server 23.

(Step S137) The mobile station 11 and content server 23 execute a transport session by transmitting packets to each other.

(Step S138) Suppose that the mobile station 11 now disconnects its link connection to the MVNO network. To this end, the mobile station 11 sends a link disconnection request to the SGW 13 via the MME 16.

(Step S139) The SGW 13 sends the PGW 41a "Delete PDP Request" message as a request for disconnecting the existing GTP tunnel.

(Step S140) In response to the above disconnection request from the SGW 13, the PGW 41 informs the FW 42 of the current state of GTP tunnel connection (i.e., the beginning of a process to disconnect a GTP tunnel), as well as of IP address and TEID pertinent to the GTP tunnel.

(Step S141) The link connection data processing unit 42a in the FW 42 updates the GTP tunnel connection status table 42c by giving "Terminating Connection" as a new value of the GTP tunnel connection status field of an entry that corresponds to the IP address and TEID received from the PGW 41.

(Step S142) The PGW 41 sends an "Accounting-Request (stop)" message to the AAA server 22 to request deauthentication of the mobile station 11.

(Step S143) In response to the RADIUS deauthentication request from the PGW 41, the AAA server 22 deauthenticates the specified mobile station. The AAA server 22 returns an "Accounting-Response (stop)" message to the PGW 41 as a response to the RADIUS deauthentication request.

(Step S144) The PGW 41 transmits a "Delete PDP Response" message to the SGW 13 as a response to the request for disconnection of the GTP tunnel.

(Step S145) The PGW 41 informs the FW 42 of successful disconnection of the GTP tunnel for the mobile station 11, as well as of the IP address of the mobile station 11 and TEID of the disconnected GTP tunnel.

(Step S146) The link connection data processing unit 42a in the FW 42 updates the GTP tunnel connection status table 42c by giving "No Connection" as a new value of the GTP tunnel connection status field of an entry that corresponds to the IP address and TEID received at step S145.

(Step S147) The link connection data processing unit 42a in the FW 42 determines whether there is an active connection of TCP session, by looking into the TCP connection status field of the address translation table 42d. For example, if the TCP connection status field contains a value of LISTEN, SYNSENT, SYNRCVD, or ESTAB, then it indicates that there is an active TCP connection. When this is the case, the link connection data processing unit 42a transmits an RST packet of the TCP protocol to the remote device (e.g., content server 23) registered in the address translation table 42d.

(Step S148) Upon receipt of the RST packet from the FW 42, the content server 23 disconnects its current TCP session with the mobile station 11.

(Step S149) The SGW 13 transmits a link connection response to the mobile station 11 via the MME 16.

(Step S150) The link connection data processing unit 42*a* in the FW 42 removes the entry of the mobile station 11 from its address translation table 42*d*.

(Step S151) Now that the mobile station 11 is unregistered from the address translation table 42*d*, the link connection data processing unit 42*a* adds the removed data of the mobile station 11 as an entry of the filtering table 42*e*. The link connection data processing unit 42*a* may delete the entry of the mobile station 11 from the filtering table 42*e* upon expiration of, for example, a time period specified by the administrator.

(Step S152) It is assumed now that there is another mobile station UE than the mobile station 11, which makes a link connection to the MVNO network. It is also assumed that the mobile station UE is assigned by the PGW 41 the same IP address as the one previously assigned to the mobile station 11, and its RADIUS authentication is successfully finished. In other words, the mobile station UE has done the above-described processing of step S121 to S132 similarly to the mobile station 11. The mobile station UE now sends an initial packet to the FW 42.

(Step S153) Upon receipt of the initial packet from the mobile station UE after RADIUS authentication, the user data processing unit 42*b* in the FW 42 consults the filtering table 42*e*.

(Step S154) The user data processing unit 42*b* translates the IP address and port number of the mobile station UE. Specifically, the user data processing unit 42*b* assigns an IP address and a port number that are both different from the ones stored in the filtering table 42*e* consulted at step S153. The user data processing unit 42*b* creates an entry of the address translation table 42*d* to make a record of the mobile station UE.

As mentioned in the above description of step S152, the mobile station UE has been assigned the same IP address as the one previously assigned to the mobile station 11, meaning that the filtering table 42*e* has an existing entry for that IP address of the mobile station 11. Accordingly, the user data processing unit 42*b* assigns the mobile station UE a different IP address from the mobile station 11's as its translated IP address. The link connection data processing unit 42*a* removes the above entry of the mobile station 11 from the filtering table 42*e* because its IP address now belongs to other mobile station UE.

(Step S155) The user data processing unit 42*b* forwards the initial packet received from the mobile station 11 at step S152, to the content server 23.

(Step S156) No packets are supposed to be transmitted from the content server 23 to the mobile station 11 because their session has already been disconnected. However, it is assumed here that the content server 23 still keeps a session connection with the mobile station 11 and thus transmits packets to the mobile station 11.

(Step S157) As a result of the processing performed at step S150, the address translation table 42*d* has no entries for the mobile station 11. The user data processing unit 42*b* in the FW 42 therefore discards packets addressed to the mobile station 11. That is, the hypothetical packet transmission at step S156 from the content server 23 to the mobile station 11 would not reach the mobile station UE in spite of their identical IP addresses, since the mobile station 11 has no link connection to the MVNO network. This is also true for UDP packets. The address translation table 42*d* and filtering table 42*e* prevent UDP packets from being transmitted to the mobile station 11 that has no link connection to the MVNO network. In contrast, user data addressed to the mobile station UE is delivered to their intended destination (unlike those addressed to the mobile station 11) because the processing at step S154 has produced an entry of the mobile station UE in the address translation table 42*d*.

As can be seen from the above, the FW 42 according to the fourth embodiment has a link connection data processing unit 42*a* to receive information about the status of GTP tunnels between the SGW 13 and PGW 41 and to produce an RST packet for disconnecting a session of the mobile station 11 based on the received information. With these features, the FW 42 disconnects the session of the mobile station 11 after its link connection to the MVNO network is nullified.

By disconnecting sessions of the mobile station 11, the FW 42 protects the content server 23 against resource exhaustion attacks by an unauthorized user. For example, in the case where the session of the mobile station 11 is still alive in spite of link disconnection, some unauthorized user would be able to attack the content server 23 by repeating connection and disconnection of a link to the MVNO network. This attack increases the number of sessions in the content server 23, which exhausts session resources and thus hampers other users from establishing their own sessions. The above-described FW 42, on the other hand, automatically disconnects each session of the mobile station 11, thus protecting the content server 23 against such resource exhaustion attacks by an unauthorized user.

It is further noted that the user data processing unit 42*b* in the above-described FW 42 employs a filtering table 42*e*, together with an address translation table 42*d*, not to assign a new mobile station UE the same translated IP address as the one previously assigned to the mobile station 11. This feature of the user data processing unit 42*b* prevents data requested by one user from being sent to another user's mobile station UE and, accordingly, protects the latter user from receiving a bill that is not pertinent to him or her.

According to the above-described fourth embodiment, the PGW 41 informs the FW 42 of the status of GTP tunnel connections, IP address of the mobile station 11, and TEID of its GTP tunnel. The fourth embodiment may be modified in such a way that the SGW 13 plays the noted role of the PGW 41. For example, the SGW 13 may be configured to receive the IP address of the mobile station 11 and its associated TEID from the PGW 41 through their exchange of GTP-C packets. The processing of step S123 may then be executed by the SGW 13. More specifically, the SGW 13 may inform the FW 42 of the status of GTP tunnel connections, IP address of the mobile station 11, and TEID of its GTP tunnel. Then at step S124, the link connection data processing unit 42*a* in the FW 42 updates the GTP tunnel connection status table 42*c* on the basis of those pieces of information received from the SGW 13. The processing at steps S129, S131, S140, S141, S145, and S146 may also be modified in a similar way.

(e) Fifth Embodiment

This section describes a fifth embodiment in detail with reference to the accompanying drawings. The foregoing first and second embodiments are designed to disconnect sessions according to, for example, observation of RADIUS authentication activities. In contrast, the fifth embodiment disconnects sessions based on the status of links.

Figure 30:
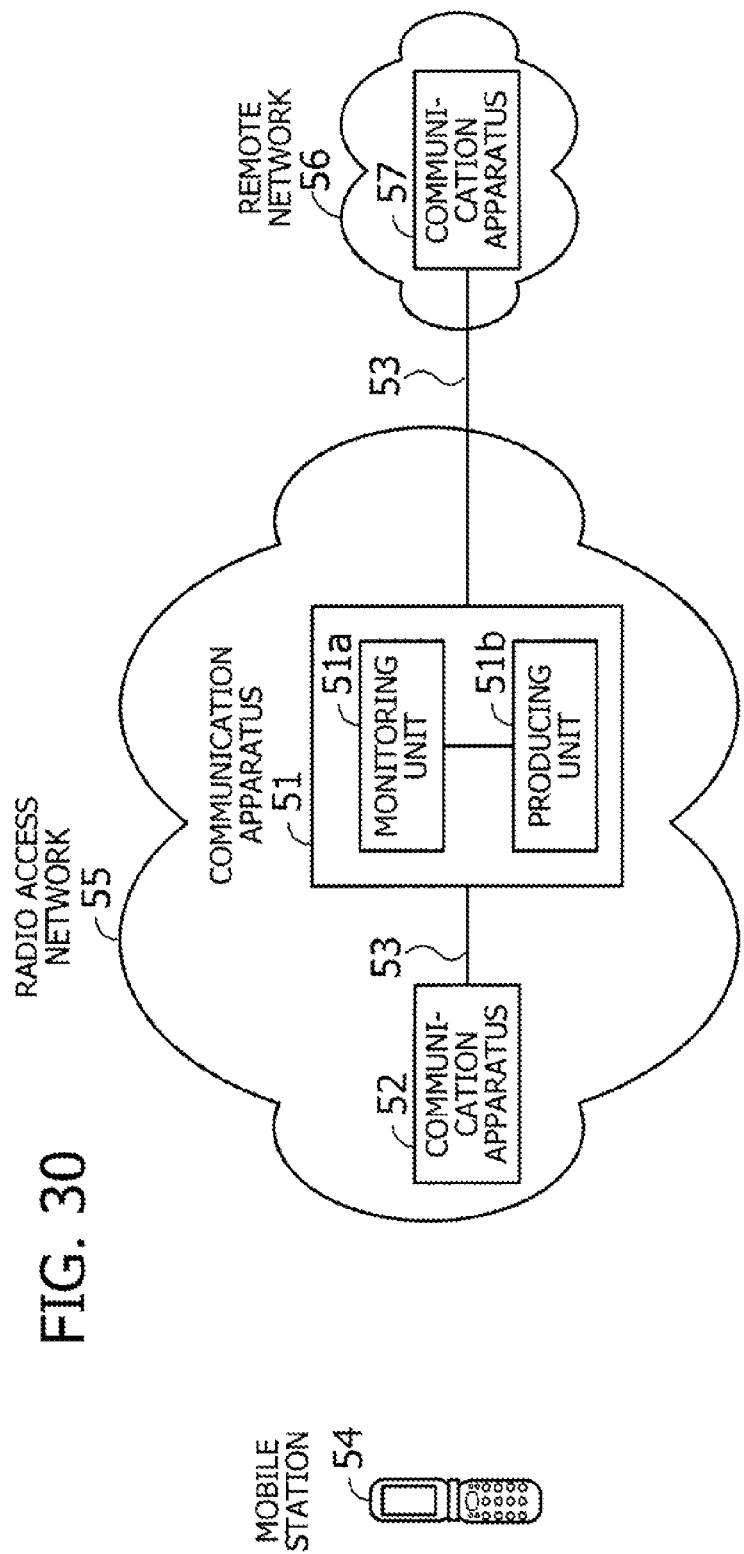
FIG. 30 illustrates communication apparatuses according to a fifth embodiment.

FIG. 30 illustrates communication apparatuses according to the fifth embodiment. As seen, one communication apparatus 51 is located in a radio access network 55, which may be an LTE network, for example. This radio access network 55 is linked to another network 56 (referred to herein as a "remote network"), which may be an MVNO network. The communication apparatus 51 may be, for example, a firewall that relays data transmission between a mobile station 54 and the remote network 56.

The mobile station 54 may be, for example, a cellular phone or other wireless communication device. This mobile station 54 is allowed to reach the remote network 56 via the communication apparatus 51 by using a radio link to an eNB (not illustrated) deployed in the radio access network 55. Another communication apparatus 52 is deployed in the same radio access network 36 to route data to and from the mobile station 54. This communication apparatus 52 may be, for example, an SGW that connects the non-illustrated eNB with the communication apparatus 51.

Located in the remote network 56 is a communication apparatus 57 serving as a PGW that forwards data to and from the mobile station 54. There is formed a link 53 between two communication apparatuses 52 and 57, which may be, for example, a GTP tunnel to convey data to and from the mobile station 54. For example, this link 53 may be formed between the communication apparatuses 52 and 57 in response to a link connection request from the mobile station 54 attempting to reach the remote network 56. The link 53 may be disconnected in response to a link disconnection request from the mobile station 54 to the remote network 56.

The communication apparatus 51 includes a monitoring unit 51a and a producing unit 51b. The monitoring unit 51a monitors the status of a link 53 between two communication apparatuses 52 and 57. For example, the communication apparatus 52 issues a request for starting a process of establishing a link 53 in order to communicate with the communication apparatus 57. The communication apparatus 52 also issues a request for disconnecting its link 53 to the communication apparatus 57. The monitoring unit 51a monitors such interaction between the two communication apparatuses 52 and 57, thereby observing the current state of the link 53.

The producing unit 51b produces information for disconnecting a session of the mobile station 54 based on the status of the link 53 that is observed by the monitoring unit 51a. When, for example, the monitoring unit 51a observes disconnection of the link 53, the producing unit 51b determines that the mobile station 54 has lost its link connection to the remote network 56, and thus produces an RST packet.

The information (RST packet) produced by the producing unit 51b is transmitted to, for example, a content server that has a session established with the mobile station 54. This transmission causes disconnection of the ongoing session of the mobile station 54 (more precisely, the session between the mobile station 54 and content server).

As can be seen from the above, the communication apparatus 51 according to the fifth embodiment has a monitoring unit 51a to monitor the status of links formed between two communication apparatuses 52 and 57, and a producing unit 51b to produce information for disconnecting a session of a mobile station 54 based on the status of its corresponding link which is observed by the monitoring unit 51a. These features of the communication apparatus 51 make it possible to release the session of the mobile station 54 subsequently to disconnection of its link to the remote network 56.

(f) Sixth Embodiment

Figure 31:
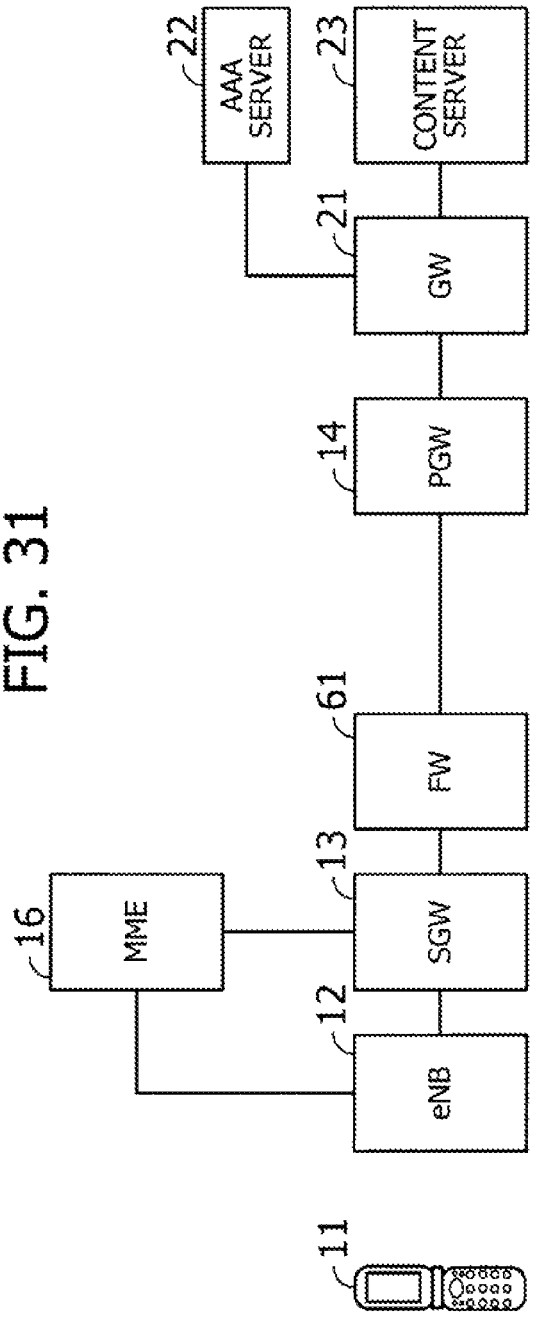
FIG. 31 illustrates an exemplary network configuration that involves a communication apparatus according to a sixth embodiment.

This section describes a sixth embodiment in detail with reference to the accompanying drawings. FIG. 31 illustrates an exemplary network configuration that involves a communication apparatus according to the sixth embodiment. Specifically FIG. 31 depicts layer-2 connections between an LTE network and an MVNO network. FIG. 31 shares some reference numerals with FIG. 2 to designate similar elements. For details of those elements, see the description of FIG. 2.

The network system of FIG. 31 is different from that of FIG. 2 in the locations of their PGW and FW. That is, the PGW and FW swap their relative positions. As another difference of FIG. 31, the LTE network is formed from eNB 12, SGW 13, MME 16, and FW 61, while the MVNO network is formed from PGW 14, GW 21, AAA server 22, and content server 23.

Figure 32:
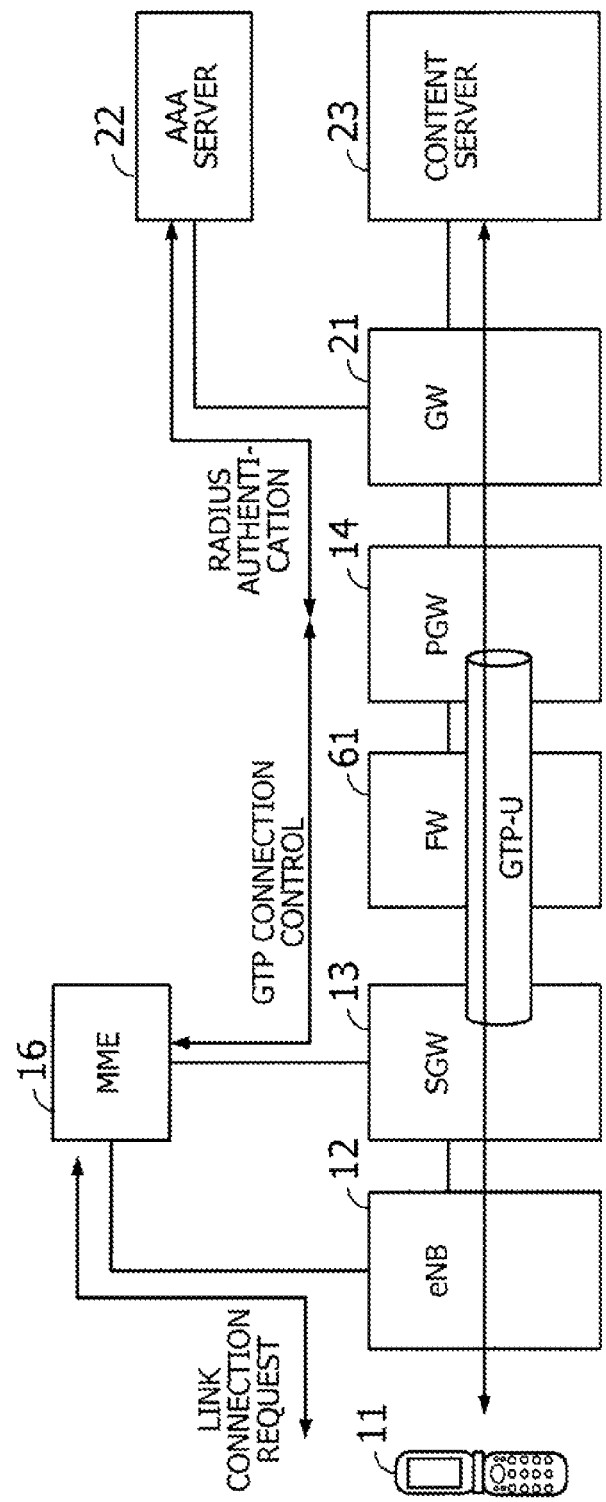
FIG. 32 illustrates how the network system of FIG. 31 works.

FIG. 32 illustrates operation of the network system of FIG. 31, using like reference numerals for like elements. Here the SGW 13 receives a link connection request from a mobile station 11 via the MME 16. In response, the SGW 13 activates the GTP-U protocol for communication with the PGW 14 to create a GTP tunnel between the SGW 13 and PGW 14. The PGW 14 works together with the AAA server 22 to perform a RADIUS authentication procedure for the mobile station 11 in response to a GTP tunnel connection request from the SGW 13. This RADIUS authentication by the PGW 14 and AAA server 22 may authenticate the mobile station 11 as a legitimate mobile station. In that case, the mobile station 11 is allowed to make access to the content server 23 and receive desired services from the content server 23. When there is a GTP tunnel disconnection request from the SGW 13, the PGW 14 and AAA server 22 clear the RADIUS authentication of the mobile station 11, thus disconnecting the link from the mobile station 11 to the MVNO network.

Figure 33:
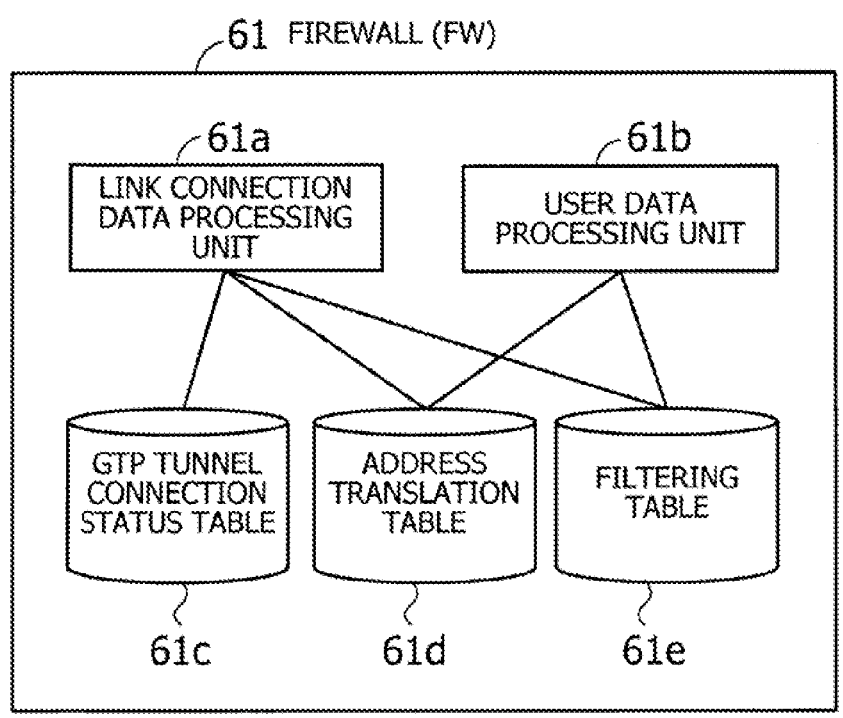
FIG. 33 is an exemplary functional block diagram of a firewall according to the sixth embodiment.

FIG. 33 is an exemplary functional block diagram of a firewall according to the sixth embodiment. As seen, the illustrated FW 61 includes a link connection data processing unit 61a, a user data processing unit 61b, a GTP tunnel connection status table 61c, an address translation table 61d, and a filtering table 61e. The link connection data processing unit 61a performs data processing operation for a mobile station 11 to make a link connection. During the course of this processing, the link connection data processing unit 61a makes access to the GTP tunnel connection status table 61c, address translation table 61d, and filtering table 61e. The user data processing unit 61b manipulates user data of the mobile station 11 after it is recognized as a legitimate user of the MVNO network. For example, the user data processing unit 61b performs NAPT processing by making access to the address translation table 61d and filtering table 61e.

The PGW 14 and AAA server 22 include functional blocks similar to those discussed previously in FIGS. 4 and 6. For details, see the description of FIGS. 4 and 6. It is also noted that the FW 61 has a hardware configuration similar to the one discussed in FIG. 7. See the description of FIG. 7 for details.

The GTP tunnel connection status table 61c works similarly to the GTP tunnel connection status table 42c discussed previously in FIG. 22 for the fourth embodiment. See the description of FIG. 22 for details of their structure. The GTP tunnel connection status table 61c of the sixth embodiment is, however, produced and updated by the FW 61 depending on monitoring results of, for example, GTP-C packets exchanged between the SGW 13 and PGW 14. This is unlike the fourth embodiment, whose GTP tunnel connection status table 42c of FIG. 22 is produced and updated by the FW 42 based on the information supplied from the PGW 41 (e.g., status of GTP tunnel connections, IP address of a mobile station 11, and TEID). In other words, the GTP tunnel connection status table 61c of the sixth embodiment is produced and updated according to the observed status of GTP tunnels between the SGW 13 and PGW 14, similarly to the monitoring of RADIUS authentication procedures in the foregoing second embodiment.

The link connection data processing unit 61a in FIG. 33 performs processing operations in a similar way to the foregoing flowcharts of FIGS. 11 and 12. One difference is that the link connection data processing unit 61a is designed to monitor GTP tunnel connection requests from SGW 13 to PGW 14, as well as GTP tunnel connection responses from PGW 14 to SGW 13, rather than monitoring their RADIUS authentication procedures. The link connection data processing unit 61a updates the GTP tunnel connection status table 61c with the monitoring result of GTP tunnel connection. Another difference is that the link connection data processing unit 61a is designed to monitor GTP tunnel disconnection requests from SGW 13 to PGW 14, as well as GTP tunnel disconnection responses from PGW 14 to SGW 13, rather than monitoring their RADIUS deauthentication procedures. The link connection data processing unit 61a also uses the monitoring result of GTP tunnel connection to update the GTP tunnel connection status table 61c.

The user data processing unit 61b operates in the same way as discussed in the flowchart of FIG. 13. See the description of FIG. 13 for details of its operation.

GTP tunnel connection may follow the state transitions in the same way as discussed in FIG. 27. See the description of FIG. 27 for details. However, the link connection data processing unit 61a according to the sixth embodiment determines state transitions by monitoring "Create PDP Context Request" and other messages transmitted between the SGW 13 and PGW 14, rather than receiving those messages.

Figure 34:
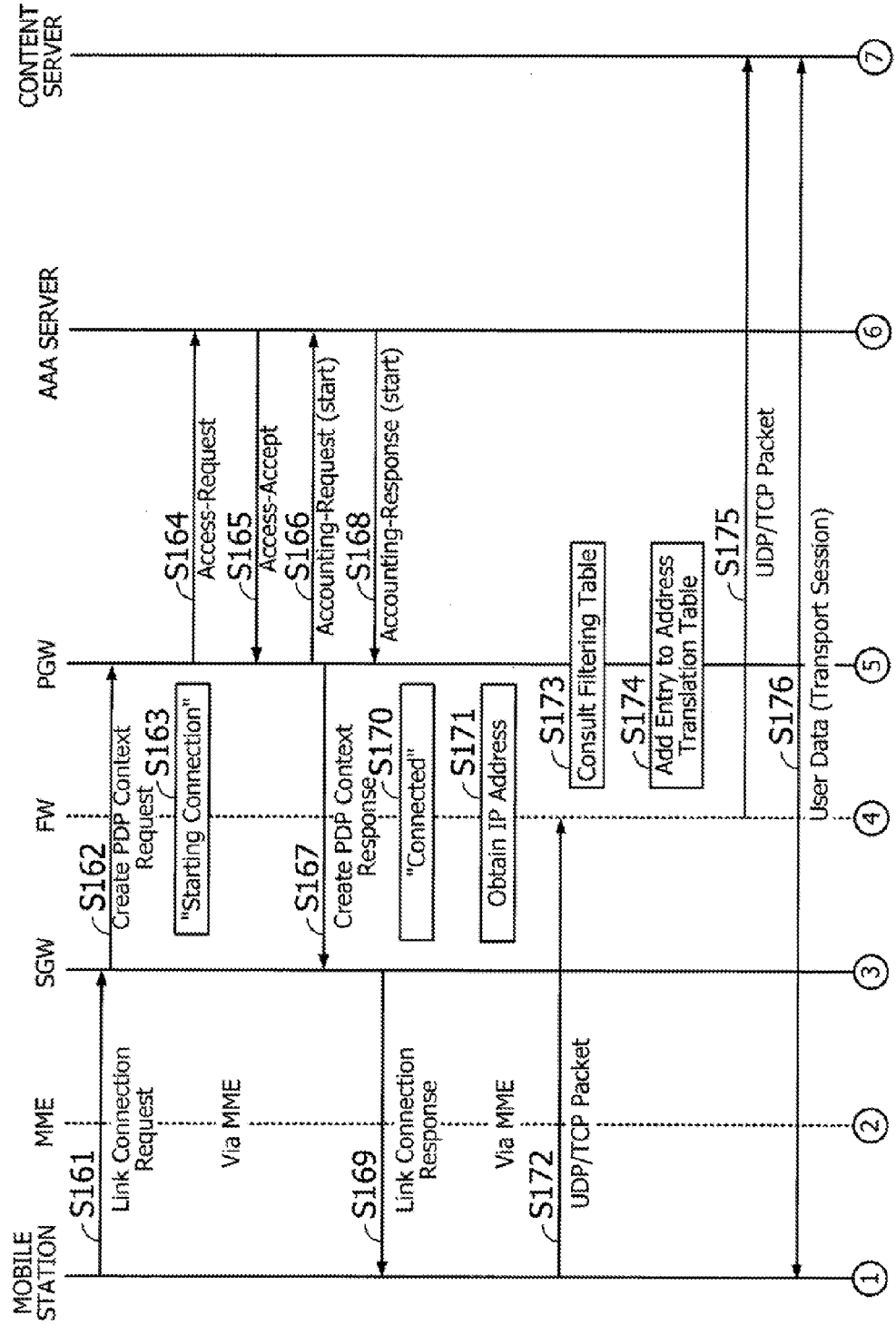
FIGS. 34 and 35 are an exemplary sequence diagram illustrating operation of the network according to the sixth embodiment.
Figure 35:
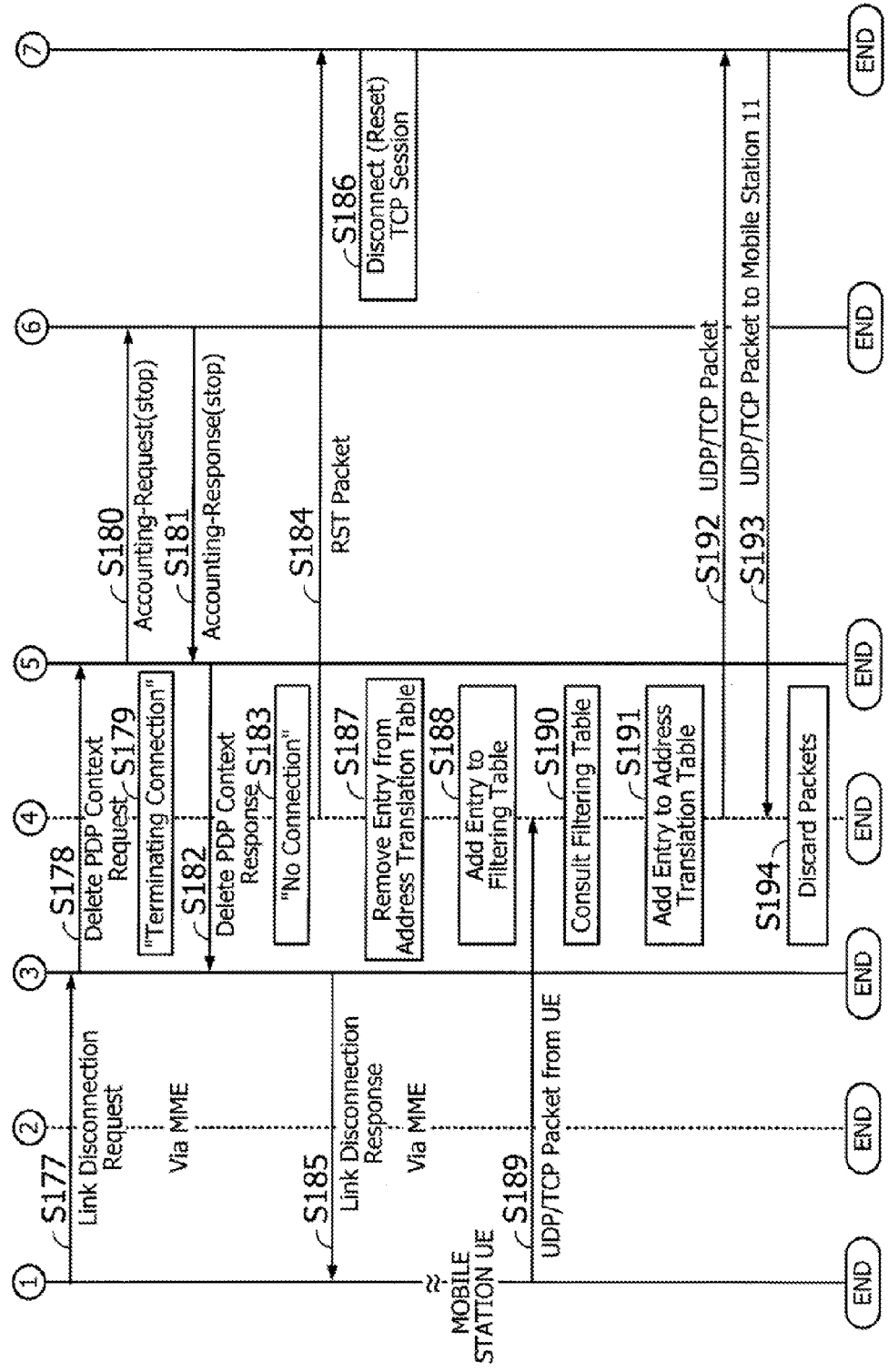

FIGS. 34 and 35 are an exemplary sequence diagram illustrating operation of the network system. The illustrated sequence involves most entities discussed in FIG. 31, namely, the mobile station 11, SGW 13, PGW 14, MME 16, AAA server 22, content server 23, and FW 61. Each step of the sequence diagram will be described below in the order of step numbers.

(Step S161) It is assumed here that the mobile station 11 is to make a connection to the MVNO network. To this end, the mobile station 11 sends a link connection request to the SGW 13 via the MME 16.

(Step S162) The SGW 13 sends the PGW 14 a "Create PDP Request" message that requests connection of a GTP tunnel thereto.

(Step S163) The link connection data processing unit 61a in the FW 61 observes the "Create PDP Request" message sent at step S162 and thus updates a relevant entry of the GTP tunnel connection status table 61c by giving "Starting Connection" as a new value of its GTP tunnel connection status field.

(Step S164) Upon receipt of the GTP tunnel connection request from the SGW 13, the PGW 14 transmits an "Access-Request" message to the AAA server 22.

(Step S165) The AAA server 22 responds with an "Access-Accept" message back to the PGW 14 to grant its access request.

(Step S166) The PGW 14 transmits an "Accounting-Request (start)" message to the AAA server 22 to request RADIUS authentication.

(Step S167) The PGW 14 transmits a "Create PDP Response" message as its response to the GTP tunnel connection request of the SGW 13, thus establishing a GTP tunnel between the SGW 13 and PGW 14.

(Step S168) The AAA server 22 returns an "Accounting-Response (start)" message to the PGW 14 as its response to the RADIUS authentication request.

(Step S169) The SGW 13 transmits a link connection response back to the requesting mobile station 11 via the MME 16.

(Step S170) The link connection data processing unit 61a in the FW 61 observes the Create PDP Response sent at step S167 and thus updates a relevant entry of the GTP tunnel connection status table 61c by giving "Connected" as a new value of its GTP tunnel connection status field.

(Step S171) The link connection data processing unit 61a in the FW 61 obtains the IP address of the mobile station 11 from the GTP-C packet transmitted at step S167 as a "Create PDP Response" message. The link connection data processing unit 61a stores this IP address in the GTP tunnel connection status table 61c.

(Step S172) The mobile station 11 sends the FW an initial packet (UDP/TCP packet) after its RADIUS authentication.

(Step S173) Upon receipt of the initial packet from the mobile station 11 after RADIUS authentication, the user data processing unit 61b in the FW 61 consults the filtering table 61e.

(Step S174) The user data processing unit 61b translates the IP address and port number of the mobile station 11. Specifically, the user data processing unit 61b assigns an IP address and a port number that are both different from the ones stored in the filtering table 61e consulted at step S173. The user data processing unit 61b creates an entry of the address translation table 61d to make a record of the mobile station 11.

(Step S175) The user data processing unit 61b forwards the initial packet received from the mobile station 11 at step S172, to the content server 23.

(Step S176) The mobile station 11 and content server 23 execute a transport session by transmitting packets to each other.

(Step S177) Suppose that the mobile station 11 now disconnects its link connection to the MVNO network. To this end, the mobile station 11 sends a link disconnection request to the SGW 13 via the MME 16.

(Step S178) The SGW 13 sends the PGW 14 a "Delete PDP Request" message requesting deletion of the existing GTP tunnel.

(Step S179) The link connection data processing unit 61a in the FW 61 observes the Delete PDP Request message sent at step S178 and thus updates a relevant entry of the GTP tunnel connection status table 61c by giving "Terminating Connection" as a new value of its GTP tunnel connection status field.

(Step S180) The PGW 14 sends an "Accounting-Request (stop)" message to the AAA server 22 to request deauthentication of the mobile station 11.

(Step S181) In response to the RADIUS deauthentication request from the PGW 14, the AAA server 22 deauthenticates the specified mobile station. The AAA server 22 then returns an "Accounting-Response (stop)" message to the PGW 14 as its response to the RADIUS deauthentication request.

(Step S182) The PGW 14 transmits a "Delete PDP Response" message to the SGW 13 as its response to the request for deletion of the GTP tunnel.

(Step S183) The link connection data processing unit 61a in the FW 61 observes the "Delete PDP Response" message sent at step S182 and thus updates a relevant entry of the GTP tunnel connection status table 61c by giving "No Connection" as a new value of its GTP tunnel connection status field.

(Step S184) The link connection data processing unit 61a in the FW 61 determines whether there is an active connection of TCP session, by looking into the TCP connection status field of the address translation table 61d. For example, if the TCP connection status field contains a value of LISTEN, SYNSENT, SYNRCVD, or ESTAB, then it indicates that there is an active TCP connection. When this is the case, the link connection data processing unit 61a transmits an RST packet of the TCP protocol to the remote device (e.g., content server 23) registered in the address translation table 61d.

(Step S185) The SGW 14 transmits a link connection response to the mobile station 11 via the MME 16.

(Step S186) Upon receipt of the RST packet from the FW 61, the content server 23 disconnects (resets) its current TCP session with the mobile station 11.

(Step S187) The link connection data processing unit 61a in the FW 61 removes the entry of the mobile station 11 from the address translation table 61d.

(Step S188) Now that the mobile station 11 is unregistered from the address translation table 61d, the link connection data processing unit 61a adds the removed data of the mobile station 11 as an entry of the filtering table 61e. The link connection data processing unit 61a may delete that entry of the mobile station 11 from the filtering table 61e upon expiration of, for example, a time period specified by the administrator.

(Step S189) It is assumed now that there is another mobile station UE than the mobile station 11, which makes a link connection to the MVNO network. It is also assumed that the mobile station UE is assigned by the PGW 14 the same IP address as the one previously assigned to the mobile station 11, and its RADIUS authentication is successfully finished. In other words, the mobile station UE has done the above-described processing of step S161 to S171 similarly to the mobile station 11. The mobile station UE now sends an initial packet to the FW 61.

(Step S190) Upon receipt of the initial packet from the mobile station UE after RADIUS authentication, the user data processing unit 61b in the FW 61 consults the filtering table 61e.

(Step S191) The user data processing unit 61b translates the IP address and port number of the mobile station UE. Specifically, the user data processing unit 61b assigns an IP address and a port number that are both different from the ones stored in the filtering table 61e consulted at step S190. The user data processing unit 61b creates an entry of the address translation table 61d to make a record of the mobile station UE.

As mentioned in the above description of step S189, the mobile station UE has been assigned the same IP address as the one previously assigned to the mobile station 11, meaning that the filtering table 61e has an existing entry for that IP address of the mobile station 11. Accordingly, the user data processing unit 61b assigns the mobile station UE a different IP address from the mobile station 11's as its translated IP address. The link connection data processing unit 61a removes the above entry of the mobile station 11 from the filtering table 61e because its IP address now belongs to other mobile station UE.

(Step S192) The user data processing unit 61b forwards the initial packet received from the mobile station UE at step S189, to the content server 23.

(Step S193) No packets are supposed to be transmitted from the content server 23 to the mobile station 11 because their session has already been disconnected. However, it is assumed here that the content server 23 still keeps a session connection with the mobile station 11 and thus transmits packets to the mobile station 11.

(Step S194) As a result of the processing performed at step S187, the address translation table 61d has no entries for the mobile station 11. The user data processing unit 61b in the FW 61 therefore discards packets addressed to the mobile station 11. That is, the hypothetical packet transmission at step S193 from the content server 23 to the mobile station 11 would not reach the mobile station UE in spite of their identical IP addresses, since the mobile station 11 has no link connection to the MVNO network. This is also true for UDP packets. The address translation table 61d and filtering table 61e prevent UDP packets from being transmitted to the mobile station 11 that has no link connection to the MVNO network. In contrast, user data addressed to the mobile station UE is delivered to their intended destination (unlike those addressed to the mobile station 11) because the processing at step S191 has produced an entry of the mobile station UE in the address translation table 61d.

As can be seen from the above, the FW 61 according to the sixth embodiment has a link connection data processing unit 61a to monitor the status of GTP tunnels between the SGW 13 and PGW 41, and a link connection data processing unit 61a to produce an RST packet for disconnecting a session of the mobile station 11 based on the observed status of GTP tunnels. With these features, the FW 61 disconnects the session of the mobile station 11 after its link to the MVNO network is nullified.

By disconnecting such sessions of the mobile station 11, the FW 61 protects the content server 23 against resource exhaustion attacks by an unauthorized user. For example, in the case where the session of the mobile station 11 is still alive in spite of link disconnection, some unauthorized user would be able to attack the content server 23 by repeating connection and disconnection of a link to the MVNO network. This attack increases the number of sessions in the content server 23, which exhausts session resources and thus hampers other users from establishing their own sessions. The above-described FW 61, on the other hand, automatically disconnects each session of the mobile station 11, thus protecting the content server 23 against such resource exhaustion attacks by an unauthorized user.

It is further noted that the user data processing unit 61b in the above-described FW 61 employs a filtering table 61e, together with an address translation table 61d, not to assign a new mobile station UE the same translated IP address as the one previously assigned to the mobile station 11. This feature of the user data processing unit 61b prevents data requested by one user from being sent to another user's mobile station UE and, accordingly, protects the latter user from receiving a bill that is not pertinent to him or her.

Figure 36:
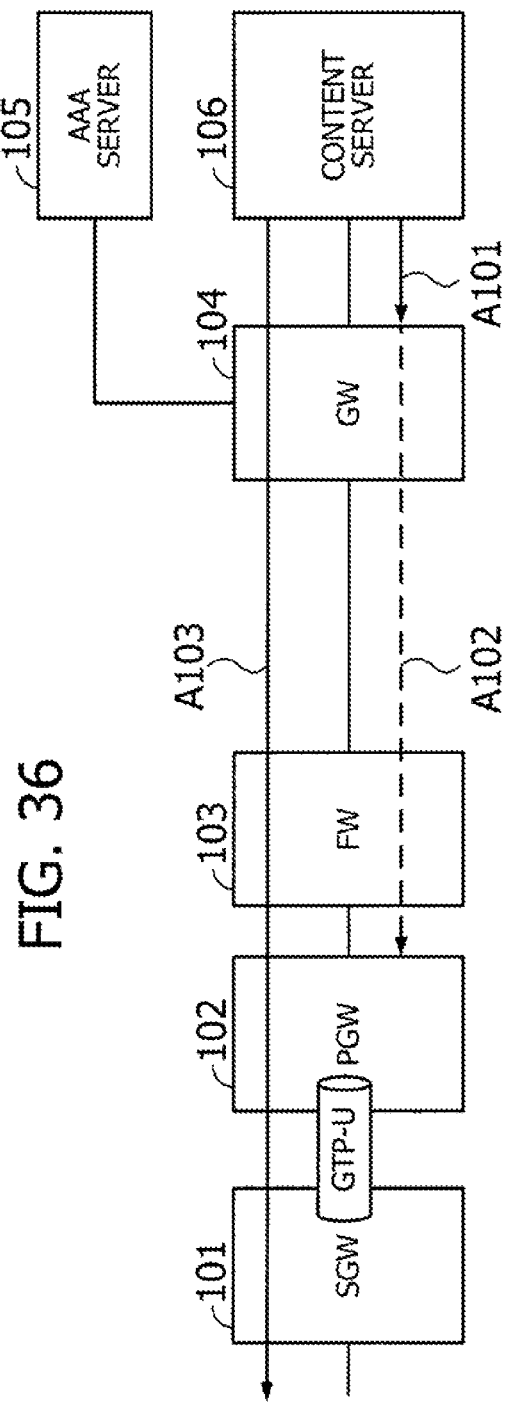
FIG. 36 illustrates how the system works when a session is not released.

The following section will now illustrate the case in which sessions are not released in spite of disconnection of links. FIG. 36 illustrates how the system works when a session is not released. The illustrated system includes an SGW 101, a PGW 102, an FW 103, a GW 104, an AAA server 105, and a content server 106. Here the SGW 101, PGW 102, and FW 103 form, for example, an LTE network, while the GW 104, AAA server 105, and content server 106 form an MVNO network.

It is assumed in the system of FIG. 36 that there is a link connection request from a mobile station UE1 (not illustrated) to the MVNO network. It is also assumed that the mobile station UE1 and content server 106 have successfully established a session for sending and receiving user data. Note that the establishment of this session consumes some amount of resources in the content server 106. It is further assumed here that the PGW 102 has assigned an IP address of 192.168.1.10 to the mobile station UE1, and that the FW 103 has translated the IP address and port number of the mobile station UE1 to "210.153.84.10" and "xxxx," respectively, by using its NAPT functions.

Suppose that the mobile station UE1 disconnects its link (GTP tunnel) without terminating the above session (communication) with the content server 106. The PGW 102 transmits a connection termination signal to the AAA server 105. When a response is returned from the AAA server 105, the PGW 102 releases the IP address of the mobile station UE1. Now that its IP address is released, the mobile station UE1 is unable to receive user data, if any, from the content server 106. Such user data is discarded at the GW 104 or PGW 102.

As noted above, the mobile station UE1 has disconnected its link without terminating the session with the content server 106 explicitly. For this reason, the content server 106 maintains the session with the mobile station UE1 until its timeout period is reached.

The arrows A101 and A102 in FIG. 36 represent the session that the content server 106 maintains in spite of disconnection of the link to the mobile station UE1. User data would be discarded at the GW 104 as indicated by the arrow A101 if the user data specifies IP address "210.153.84.10" and port number "xxxx" as the destination (i.e., it is addressed to mobile station UE1). User data with an IP address of 192.168.1.10 (i.e., also addressed to mobile station UE1) is similarly discarded at the PGW 102, as indicated by the arrow A102.

Suppose now that the mobile station UE1 issues a link connection request again and establishes a session with the content server 106. It is assumed that a new IP address "192.168.1.20" is assigned to the requesting mobile station UE1, and that the FW 103 translates the IP address and port number of the mobile station UE1 to "210.153.84.10" and "yyyy", respectively, by using NAPT functions. The content server 106 receives packets transmitted from the LTE network. Because of their new port number, the content server 106 takes them as a communication request from some other mobile station than the mobile station UE1. Therefore a session is newly established between the content server 106 and mobile station UE1 as indicated by the arrow A103.

As can be seen from the above example, the resources in the content server 106 could be occupied by a particular mobile station UE1 if that mobile station UE1 repeats connection and disconnection of its link without canceling established sessions. According to the above-described first to sixth embodiments, however, the proposed communication apparatuses and firewalls are designed to release sessions of mobile stations, thus preventing resources in the content server 106 from being occupied by a particular mobile station UE1.

As another example, think of the following case in the system illustrated in FIG. 36. That is, there is a link connection request from a first mobile station UE1 (not illustrated) to the MVNO network. The first mobile station UE1 has been allocated an IP address of 192.168.1.10, and the FW 103 with NAPT functions translates the IP address and port number of the first mobile station UE1 to "210.153.84.10" and "xxxx," respectively. The mobile station UE1 then disconnects the link without terminating its session with the content server 106. A second mobile station UE2 (not illustrated) now issues a link connection request and establishes a session with another content server 106 before the former content server 106 cancels the session of the first mobile station UE1 because of timeout. During the process of establishing its link connection, the second mobile station UE2 is allocated an IP address of "192.168.1.10," the same address as the one previously allocated to the first mobile station UE1. The FW 103 with NAPT functions translates the IP address and port number of the second mobile station UE2 to "210.153.84.10" and "xxxx," respectively.

If the content server 106 transmits data to the first mobile station UE1 under the above situation, the network delivers the data transmission to the second mobile station UE2. The user of the second mobile station UE2 may thus be charged for the irrelevant data transmission. The foregoing FWs according to the second, fourth, and sixth embodiments avoid this problem by ensuring allocation of different IP addresses and port numbers to the first and second mobile stations UE1 and UE2. For example, the proposed FWs would assign IP address "210.153.84.11" and port number "yyyy" to the second mobile station UE2 in the context described above. The noted features of the embodiments prevent the user of the second mobile station UE2 from being charged for irrelevant data transmission.

Figure 37:
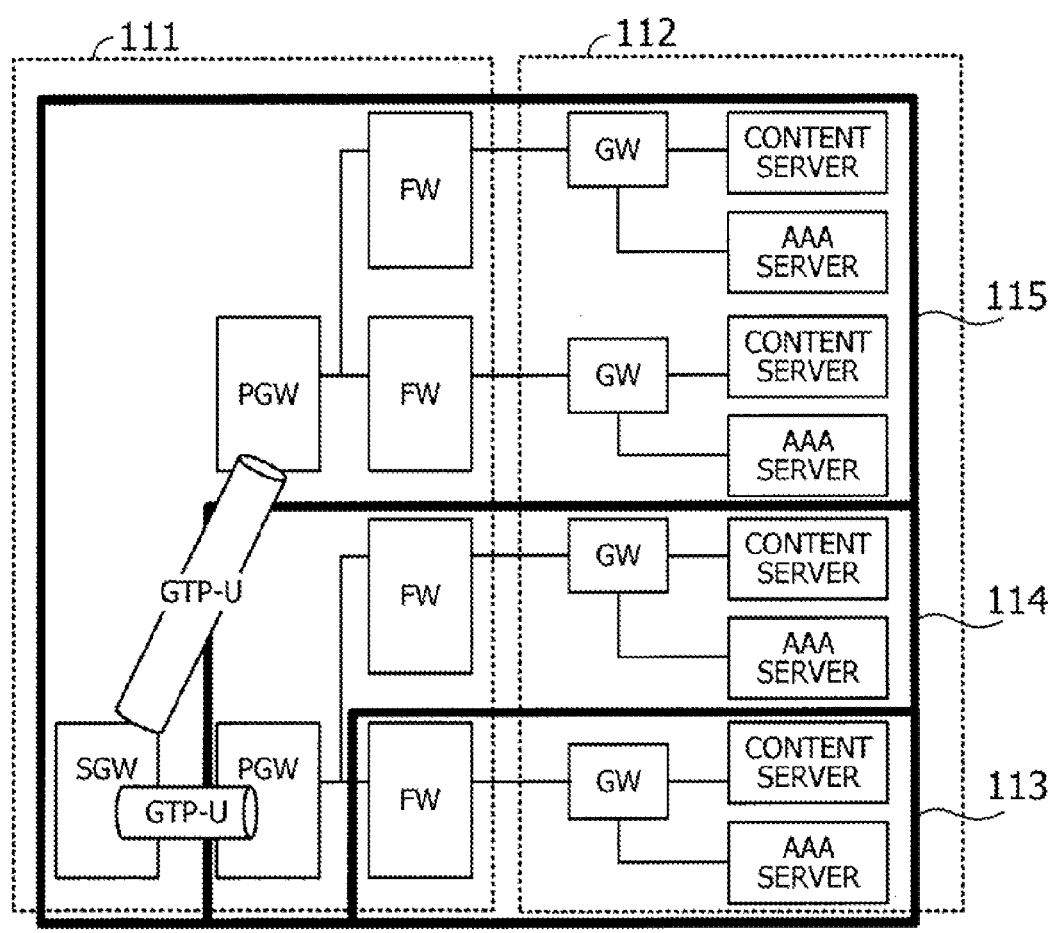
FIG. 37 illustrates where the above embodiments apply.

The above-described embodiments may work in different portions of a network system. For example, FIG. 37 illustrates where the above embodiments may apply. The system illustrated in FIG. 37 is formed from an SGW, PGWs, FWs, GWs, AAA servers, and content servers, where two broken-line frames 111 and 112 indicate an LTE network and an MVNO network, respectively.

For example, the foregoing second embodiment is designed to disconnect a session of a mobile station 11 based on the status of RADIUS authentication being monitored by the FW 15. Accordingly, the proposed techniques of the second embodiment may be applied in, for example, the area indicated by a frame 113 in FIG. 37.

According to the fourth embodiment, the FW 42 disconnects a session of a mobile station 11 based on information received from the PGW 41 about the status of GTP tunnels. The proposed techniques of the fourth embodiment may therefore be applied in, for example, the area indicated by another frame 114 in FIG. 37.

According also to the fourth embodiment, the FW 42 may receive information from the SGW 13 about the status of GTP tunnels and disconnect a session of a mobile station 11 based on that information. In this case, the proposed techniques of the fourth embodiment may be applied in the area indicated by yet another frame 115 in FIG. 37.

Further, according to the sixth embodiment, the FW 61 monitors GTP tunnels and disconnects a session of a mobile station 11 based on the observed status of GTP tunnels. The proposed techniques of the sixth embodiment may therefore be applied in, for example, the area indicated by the frame 115 in FIG. 37. It is noted here that the FW and PGW swap their positions, and the PGW is located in the MVNO network in the sixth embodiment.

Various embodiments have been described above. The disclosed communication apparatuses make it possible to disconnect sessions of mobile stations after their links to a remote network are disconnected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A communication apparatus used in a radio access network to relay data transmission to and from a remote network, the communication apparatus comprising:
    a monitoring unit configured to monitor an authentication procedure performed when a mobile station makes a connection of a link to the remote network, as well as when the mobile station disconnects the link to the remote network;

a producing unit configured to produce information for disconnecting a session of the mobile station based on progress of the authentication procedure monitored by the monitoring unit;

a translation table to translate address information of the mobile station;

a filtering table to store the address information that is transferred from the translation table when the mobile station is deauthenticated in response to disconnection of the link of the mobile station; and an allocation unit, responsive to completion of the authentication procedure of the mobile station which is performed when the mobile station makes a connection of a link, to select address information that is different from the address information stored in the filtering table and allocate the selected address information to the mobile station, as well as entering the selected address information in the translation table.

2. The communication apparatus according to claim 1, wherein the producing unit produces the information for disconnecting the session of the mobile station, when the monitoring unit has observed deauthentication of the mobile station.

3. The communication apparatus according to claim 1, wherein the information produced by the producing unit is transmitted to a server that has a session established with the mobile station.

4. A communication apparatus used in a radio access network to relay data transmission to and from a remote network, the communication apparatus comprising:

a receiving unit configured to receive information indicating status of a link that is established between first and second communication apparatuses in the radio access network to convey data to and from a mobile station;

a producing unit configured to produce information for disconnecting a session of the mobile station based on the information indicating the status of the link that is received by the receiving unit;

a translation table to translate address information of the mobile station;

a filtering table to store the address information that is transferred from the translation table when the link between the first and second communication apparatuses is disconnected; and an allocation unit, responsive to establishment of the link between the first and second communication apparatuses, to select address information that is different from the address information stored in the filtering table and allocate the selected address information to the mobile station, as well as entering the selected address information in the translation table.

5. The communication apparatus according to claim 4, wherein the producing unit produces the information for disconnecting the session of the mobile station, when the receiving unit has received information indicating disconnection of the link of the mobile station.

6. The communication apparatus according to claim 4, wherein the information produced by the producing unit is transmitted to a server that has a session established with the mobile station.

7. A communication apparatus used in a radio access network to relay data transmission to and from a remote network, the communication apparatus comprising:

a monitoring unit configured to monitor status of a link that is established between first and second communication apparatuses in the radio access network to convey data to and from a mobile station;

a producing unit configured to produce information for disconnecting a session of the mobile station based on the status of the link that is monitored by the monitoring unit;

a translation table to translate address information of the mobile station;

a filtering table to store the address information that is transferred from the translation table when the link between the first and second communication apparatuses is disconnected; and an allocation unit, responsive to establishment of the link between the first and second communication apparatuses, to select address information that is different from the address information stored in the filtering table and allocate the selected address information to the mobile station, as well as entering the selected address information in the translation table.

8. The communication apparatus according to claim 7, wherein the producing unit produces the information for disconnecting the session of the mobile station when the monitoring unit has observed disconnection of the link of the mobile station.

9. The communication apparatus according to claim 7, wherein the information produced by the producing unit is transmitted to a server that has a session established with the mobile station.

* * * * *